US012675789B2

(12) United States Patent
Mee

(10) Patent No.: US 12,675,789 B2
(45) Date of Patent: Jul. 7, 2026

(54) DESTINATION ADDRESSING ASSOCIATED WITH A DISTRIBUTED LEDGER

(71) Applicant: nChain Holdings Limited, St. John's (AG)

(72) Inventor: Andy Mee, Cardiff (GB)

(73) Assignee: NCHAIN LICENSING AG, Zug (CH)

( * ) Notice: Subject to any disclaimer, the term of this patent is extended or adjusted under 35 U.S.C. 154(b) by 269 days.

(21) Appl. No.: 17/604,389

(22) PCT Filed: Mar. 27, 2020

(86) PCT No.: PCT/IB2020/052935
§ 371 (c)(1),
(2) Date: Oct. 15, 2021

(87) PCT Pub. No.: WO2020/212784
PCT Pub. Date: Oct. 22, 2020

(65) Prior Publication Data
US 2022/0270085 A1     Aug. 25, 2022

Related U.S. Application Data

(63) Continuation of application No. 16/384,696, filed on Apr. 15, 2019, now abandoned.

(30) Foreign Application Priority Data

May 21, 2019     (GB) ...................................... 1907180

(51) Int. Cl.
*G06Q 20/38* (2012.01)
*G06Q 20/40* (2012.01)
(52) U.S. Cl.
CPC ....... *G06Q 20/385* (2013.01); *G06Q 20/3825* (2013.01); *G06Q 20/3829* (2013.01); *G06Q 20/4014* (2013.01); *G06Q 2220/00* (2013.01)

(58) Field of Classification Search
CPC ............. G06Q 20/385; G06Q 20/3825; G06Q 20/3829; G06Q 20/4014; G06Q 2220/00; G06Q 20/065
See application file for complete search history.

(56) References Cited

U.S. PATENT DOCUMENTS

| | | | |
|---|---|---|---|
| 10,776,761 B2 | 9/2020 | MacGregor et al. | |
| 11,044,257 B1 * | 6/2021 | Heuts ................... | H04L 63/108 |

(Continued)

FOREIGN PATENT DOCUMENTS

| | | | |
|---|---|---|---|
| CN | 109088722 A | 12/2018 | |
| WO | WO-02079935 A2 * | 10/2002 | ............. G06Q 20/02 |

(Continued)

OTHER PUBLICATIONS

"A Blockchain Based Privacy-Preserving Incentive Mechanism in Crowdsensing Applications", Jingzhong Wang, Dec. 31, 2017 (Year: 2017).*

(Continued)

*Primary Examiner* — Duan Zhang
(74) *Attorney, Agent, or Firm* — Tarolli, Sundheim, Covell & Tummino LLP

(57) ABSTRACT

The present disclosure relates to methods, devices and/or systems associated with a transaction for a distributed ledger, such as the Bitcoin blockchain. In some embodiments, the present disclosure relates to a method for performing payer entity validation, based on the request. In other embodiments the present disclosure relates to a method for implementing asynchronous processing of a request sent by a payer entity, when a payee entity is non-responsive.

10 Claims, 17 Drawing Sheets

(56)　　　　　　References Cited

U.S. PATENT DOCUMENTS

| | | | |
|---|---|---|---|
| 2003/0161335 A1* | 8/2003 | Fransdonk | G06Q 20/12 |
| | | | 370/401 |
| 2008/0154772 A1* | 6/2008 | Carlson | G06Q 20/3255 |
| | | | 705/44 |
| 2015/0269539 A1 | 9/2015 | Macgregor et al. | |
| 2016/0364721 A1 | 12/2016 | Deliwala et al. | |
| 2017/0161843 A1* | 6/2017 | Rizzini | G06Q 40/12 |
| 2017/0237726 A1* | 8/2017 | Wang | H04W 12/06 |
| | | | 726/7 |
| 2018/0053182 A1* | 2/2018 | Mokhasi | H04L 63/126 |
| 2019/0057362 A1* | 2/2019 | Wright | G06Q 20/065 |
| 2019/0095879 A1* | 3/2019 | Eyal | G06Q 20/223 |
| 2019/0373475 A1* | 12/2019 | Top | H04W 12/037 |
| 2020/0265423 A1* | 8/2020 | Alves | G06Q 20/4012 |

FOREIGN PATENT DOCUMENTS

| | | | | |
|---|---|---|---|---|
| WO | 2017/081534 A1 | 5/2017 | | |
| WO | 2018039722 A1 | 3/2018 | | |
| WO | WO-2018121797 A1 * | 7/2018 | | H04L 9/0825 |
| WO | 2019015382 A1 | 1/2019 | | |

OTHER PUBLICATIONS

Antonopoulos, "Mastering Bitcoin—Unlocking Digital Cryptocurrencies," O'Reilly Media, Inc., Dec. 20, 2014, 282 pages.
International Search Report and Written Opinion for Application No. PCT/IB2020/050686, mailed Mar. 26, 2020, filed Jan. 29, 2020, 8 pages.
International Search Report and Written Opinion for Application No. PCT/IB2020/052935, mailed Mar. 27, 2020, filed May 29, 2020, 17 pages.
Nakamoto, "Bitcoin: A Peer-to-Peer Electronic Cash System," Bitcoin, Oct. 31, 2008, https://bitcoin.org/bitcoin.pdf, 9 pages.
Panarello et al., "Blockchain and IoT Integration: A Systematic Survey," MDPI, Aug. 6, 2018, 38 pages.
Satoshi et al., "Connection Limits," Bitcoin Forum, Aug. 9, 2010, https://bitcointalk.org/index.php?topic=741.0;prev_next=prev, 2 pages.
UK IPO Search Report mailed Oct. 31, 2019, Patent Application No. GB1907180.2, 6 pages.
Zima, "Sending Money like Sending E-mails: Cryptoaddresses, The Universal Decentralised Identities," Dec. 15, 2016, 9 pages.
CN Office Action for corresponding CN Patent Application No. 202080029288.9, issued Jul. 31, 2025, 35 pages.

* cited by examiner

Receive a request for a transaction associated with an alias

202a

Locate a service record for the payment service related to the alias

204a

Obtain the location of a host computing resource for the payment service

206a

Determine a public address of an entity associated with the alias

208a

Send a request for a transaction associated with an alias

202b

Obtain a location of a host computing resource for a payment service, based on a service record 206b Determine a public address of an entity associated with the alias 208b Obtain a PKI request template from a machine readable resource

402

Generate a complete PKI request based on an alias

404

Provide a HTTP GET request based on the complete PKI request

406

Obtain a public key associated with the alias

408

502a    Access a machine readable resource

504a    Obtain a payment destination endpoint identifier

506a    Obtain payment details for a transaction

508a    Obtain a digital signature

510a    Verified?

No

Yes

512a    Generate an output script associated with the payment destination endpoint identifier 602    Obtain a payment destination request template from a machine readable resource 604    Generate a complete payment destination request based on an alias 606    Provide a HTTP POST request based on the complete payment destination request 608    Obtain a payment destination endpoint identifier associated with the alias 702   Access a machine readable resource associated with a payment service 704   Add at least one further capability supported by the payment service 1302    Obtain a public key validity request template from a machine readable resource 1304    Generate a complete public key validity request based on an alias 1306    Provide a HTTP GET request based on the complete public key validity request 1308    Obtain a response confirming validity of the public key for the alias

DESTINATION ADDRESSING ASSOCIATED WITH A DISTRIBUTED LEDGER

CROSS-REFERENCE TO RELATED APPLICATION

This application is a 371 National Stage Patent Application of International Patent Application No. PCT/IB2020/052935, filed on Mar. 27, 2020, which claims priority to United Kingdom Patent Application No. 1907180.2, filed May 21, 2019, and U.S. patent application Ser. No. 16/384, 696, filed Apr. 15, 2019, the disclosures of which are incorporated herein by reference in their entirety.

TECHNICAL FIELD

This disclosure relates generally to methods and systems for facilitating transactions associated with a distributed ledger, and more particularly to methods for destination addressing for one or more of digital wallets. The disclosure is particularly suited, but not limited to providing methods for facilitating digital asset transfers or payments from a payee to a payer.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource. The term "Bitcoin" is used herein to include any version or variation that derives from or is based on the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, then the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated cryptocurrency to another address associated with an input in another transaction. This is often done using a digital cryptocurrency wallet. This digital wallet may be a device, physical medium, program, application (app) on a mobile terminal, or a remotely hosted service associated with a domain on a network work, such as the Internet. The digital wallet stores public and private keys and can be used to track ownership of assets etc. associated with a user, receive or spend cryptocurrencies. The cryptocurrency itself is not in the digital wallet, In case of bitcoin and cryptocurrencies derived from it, the crypto-currency is de-centrally stored and maintained in the publicly available ledger, i.e. the blockchain. There are various forms of known cryptocurrency wallets, and a network of such wallets is referred to as an ecosystem, such as the ecosystem of Bitcoin SV (BSV) wallets.

Presently, in order to facilitate a BSV cryptocurrency payment between users, i.e. from Alice and Bob, Alice would need to have a digital wallet associated with her (private and public) cryptographic keys and would need to know Bob's public address for sending cryptocurrencies, i.e. Bob's digital wallet address. The public addresses associated with an entity, herein a digital wallet, as are usually automatically generated by an address generation program. These public addresses are a string of digits in a specific format that is recognised by the cryptocurrency network and is used for transactions. For instance, these may be the Bitcoin addresses for BSV based cryptocurrency networks. This can be referred to as the public key or hash of the public key of the asymmetric private/key pair associated with an entity. Public addresses can be shared publicly so that other users know where to send payments in cryptocurrency to. However, public addresses which are recognised and used by the BSV wallet ecosystem or other cryptocurrency wallets are in formats such as:

17Dx2iAnGWPJCdqVvRFr45vL9YvT86TDsn.

Accordingly, Alice would need to know or be provided with this type of an address to send cryptocurrency to Bob. Furthermore, more than one type of address may be used by the entity or wallet for different types of transactions, and these addresses may only be used once to facilitate one transaction written on the blockchain. It will be evident that these public addresses are not in a user-friendly or simple to use or memorise format. Thus, these public addresses or keys for transactions would need to be identified or obtained or derived for each transaction, and further may need to be stored/cached for certain periods by an entity wishing to make a cryptocurrency payment to another entity.

Thus, while it is desirable to use blockchain technologies for recording data and events, as the blockchain provides advantages such as a tamper-proof and permanent record, there is a difficulty in identifying or establishing a destination address for a cryptocurrency payment. This is because the operable format of these addresses recognised in a wallet ecosystem is not simple or user friendly. Once reason for this format could be the security aligned with it, along with specified naming protocols for public IP addresses applied across digital payment networks. Another reason is that the Bitcoin blockchain stores the data in transactions (Tx) which are built up into blocks. Identifying and then accessing the relevant data from the blockchain is based on the public address (linked to the private keys) of the entities involved in the transaction. The present disclosure addresses these technical concerns by providing aspects and embodiments for an improved destination identification and/or payment addressing for a cryptocurrency ecosystem.

Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps.

SUMMARY

The present disclosure relates to methods, devices and/or systems associated with a transaction for a distributed ledger. In some embodiments, the present disclosure relates to a method for performing a sender entity or payer entity validation for a request associated with an alias of a recipient entity or payee entity. This is to establish to check that the request originates from a payer entity, or an addressing process/protocol or mechanism, such as a payment service associated with the payer entity. The embodiment includes sending the request from a payer entity, the request based on an alias for the payee entity. The embodiment includes validating the payer entity based on a timestamp and digital signature included in the request. Responsive to successful validation, an output script associated with the payee entity is provided to the payer entity. This output script may be used for creating a transaction, the transaction to be stored on or posted to a distributed ledger.

In other embodiments the present disclosure relates to a method for implementing asynchronous or discontinuous or delayed processing of a request sent by a payer entity. This embodiment includes sending the request from the payer entity, the request based on an alias for the payee entity. The embodiment includes providing an acknowledgment of receipt of the request to the payer entity, usually in the form of a token that is specific to the request. A notification may be sent to the payee entity regarding the request. This notification is sent even when the payee client is unavailable or offline, i.e. without network or Internet connectivity, so that it can be received and accessed when the payee client is back online. Once the payee client approves the request, the embodiment includes generating and/or providing an output script associated with the payee entity to the payer entity, where the output script is correlated with the correct request based on the token. The output script can then be used for creating a transaction, the transaction to be stored on or posted to the distributed ledger.

Further and related aspects and embodiments of the present disclosure are explained in the detailed description below. Combinations of the aspects and embodiments discussed herein may be implemented, according to the present disclosure.

One or more computing devices, or a system, including one or more processors may be provided for executing computer readable instructions, i.e. a program, for implementing the above embodiments.

BRIEF DESCRIPTION OF THE DRAWINGS

Aspects and embodiments of the present disclosure will now be described, by way of example only, and with reference to the accompany drawings, in which.

DESCRIPTION OF EMBODIMENTS

Figure 1:
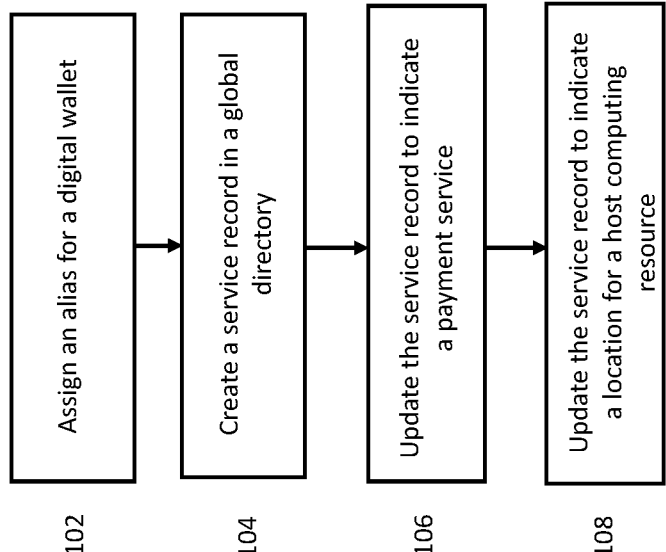
FIG. 1 is a flow diagram depicting a method of updating a directory to include a payment service according to a first aspect of the present disclosure.

While the appended claims are in relation to the fourth and fifth aspects of the discussed in detail below, a detailed discussion in details to the first, second and third aspects are provided herein to provide a reader with a full and complete understanding of the claimed aspects and related embodiments of the present disclosure.

In accordance with a first aspect the present disclosure, a computer implemented method of implementing an addressing process or protocol for one or more clients for transactions associated with a distributed ledger is provided. The addressing process is referred as a payment service for the one or more clients. This is because some aspects and embodiments of the present disclosure are concerned with transactions associated with a transfer of a digital asset, such as cryptocurrency, from one entity to another. However, the term payment service is not to be considered as being limited to a mechanism for payment digital assets, but as an entity or process that facilitates an addressing mechanism for any entity or client to send a request or communication to another such entity or client, and where such communication may be stored, or associated with, or submitted to distributed ledger, i.e. a blockchain. The term service is to be understood as the provision of one or more processes or protocols or functions that may be used by and for one or more computing devices that wish to access or operate such functionality, and/or that required access to such functionality.

Similarly, the term payer is not to be considered as being limited to an entity that makes a payment, but is to be understood as a sender of a request or communication or a transaction request. The term payee is also in the same way to be understood as a recipient of the request or communication from the sender. For ease of explanation alone of the aspects and embodiments of the disclosure, the terms payment service, payer client and payee client have been used throughout hereinafter, but are not considered to be limiting, and also encompass the above.

The method of the first aspect comprises providing an alias for a given client, the alias being specific to the given client, the alias including or related to a network identifier. The method then includes associating the alias with the network identifier in a directory. This association is achieved by the steps of creating a service record based on the network identifier in the directory. The service record is then updated to indicate that the payment service is provided by a network or a domain associated with the network identifier and a location for a host computing resource responsible for the payment service, wherein the host computing resource is configured to facilitate identification of the client associated with the alias, responsive to receipt of a request pertaining to a transaction related to the alias.

In some embodiments, the one or more clients referred to above relate to one or more entities such as computing resources, user terminals or applications associated with a computing resource. In some embodiments, each client may be a digital wallet or may be an entity that is associated with a digital wallet, such as a user terminal having a digital wallet or application for a digital wallet installed. Although the aspects and embodiments of the present disclosure relate to digital wallets, it is to be understood that client entities not having a digital wallet or a separate application for one, but which are configured to provide the functionality for operating as or with or similar to digital wallet are also within the scope of this disclosure. For ease of explanation alone, the following description relate to digital wallets (client entities associated with a digital wallet), but the disclosure is in no way limited to client entities with digital wallets alone.

The one or more digital wallets referred above in the first aspect is one of a plurality of digital wallets in a network, sometimes referred to an ecosystem of digital wallets, such as a wallet ecosystem of a plurality of Bitcoin BSV cryptocurrency wallets. In other embodiments, the wallet may not be part of a network of wallets and may simply be a separate, stand-alone entity that is associated with a domain. In both cases, the network identifier may be, or may include a domain name of a network, for example nchain.com. In some embodiments, the directory may be an open, i.e. accessible and/or a decentralised system such as the Domain naming system (DNS), and may be referred to as a global directory. The location of the host computing resource may be the location of a server that is responsible for the provision of the payment service for the network. For example this may be an endpoint universal resource identifier (URI) and may include the universal resource location (URL) of a web server, from where the payment service may be accessed by other entities. For example, the other entities may be digital wallets that may or may not be part of the network associated with the network identifier, one or more payment server or client entities, or a payment application.

Advantageously, the first aspect enables a domain owner of one or more digital wallets to make use of a payment service for managing one or more functions for facilitating transactions, such as payment transactions, from a requesting (payer) entity associated with a digital wallet to a destination (payee) entity as a one-time activity, i.e. by creation of a service record (an SRV record). Although service records in the DNS to identify an endpoint for a service are well known, such records are not used or configured for enabling payment transactions associated with a blockchain.

Advantageously, the above aspect enables a request related to a payment transaction to be made using an alias to address the payee entity or digital wallet associated with the payee. Thus, there is no need for the requesting (payer entity) to know, obtain or save/cache complicated public addresses anymore, i.e. 17Dx2iAnGWPJCdqVvRFr45vL9YvT86TDsn, for a digital wallet in order to effect or construct a cryptocurrency transaction for the distributed ledger, so that a cryptocurrency payment can be made to this wallet. A memorable alias for or related to the network for the payee, for example one that may relate to an email address format of the payee name@domain.com), would be all that is required to be known or sent by the requesting entity for requesting a payment transaction. Other formats that identify the entity may also be used as the alias. This type of alias addressing provides a much simpler and user friendly techniques for resolving an address for a payment destination. In some embodiments, even if the network identifier is not made explicit in the alias, as long as the alias can be associated with the network identifier, i.e. by a look up of a directory or database, this will suffice for identifying the payment service associated with the alias.

In some embodiments, the method includes performing a search of the directory based on the alias in response to a request from a requesting entity pertaining to a transaction associated with the alias. The request pertaining to a transaction refers to a request for information required to generate or construct transaction that is to be posted on the distributed ledger, i.e. the blockchain. Thus this request is not to generate the blockchain transaction itself, but simply a request for, or pertaining to, a future transaction, i.e. an off-block request for information for generating a transaction that is to be posted to the blockchain in the future. This is be understood to be a request for a future transaction for the blockchain. For ease of reference, the description henceforth discusses a request for a transaction to describe this step. It will be understood that this request pertains to a future transaction for the blockchain. The method includes identifying the service record for the payment service in the directory that relates to the network identifier and returning the location of the host computing resource for the payment service. Based on the returned location, a public address associated with the digital wallet associated with the alias can be determined. This will, in some embodiments, correspond to the public address that may be associated with a future transaction for a distributed ledger, i.e. the Bitcoin blockchain. In some embodiments the step of returning the location of the host computing resource includes returning a target and port pair, wherein the target includes an identifier of the host computing resource, and wherein the port includes an identifier for an Internet protocol communication port used by the payment service.

Advantageously, this enables discovery of a host responsible for providing a payment service to facilitate a payment transaction to a payee entity, based on just the alias of the payee entity, thereby significantly simplifying payment addressing for payment transactions for a digital ledger. Once the host has been located, a public address associated with the client or digital wallet of the payee entity can be determined since the digital wallet is associated with the network or network identifier, and thereby associated with the payment service. The term public address referred herein relates to an identity or address for a digital wallet or client, and in some embodiments, pertaining to one or more (future) transactions for the distributed ledger. In some embodiments, the public address may be the payment address or destination address for the client or digital wallet. In other embodiments, the public address may be used to derive the payment or destination address. This public address may be the same, or may be different for each transaction that is associated with the digital wallet.

In some embodiments, the method according to the first aspect of the disclosure includes a method being implemented on a payment client entity. This may be a requesting entity that is associated with a digital wallet for cryptocurrency. In this case, the method implemented by the payment client entity comprises the steps of sending from a requesting entity a request for a transaction, the request associated with the alias. The method includes obtaining the location of host computing resource associated with the payment service, the location being based on a service record related to the network identifier that is identified in a search of a directory. The method then includes receiving a public address of the digital wallet associated with the alias, the public address for use in the requested transaction, henceforth.

In some embodiments, the host computing resource is associated with a payment network that is different to the network identifier associated with the one or more digital wallets, and wherein the payment service for a plurality of entities registered with a domain associated with the network identifier is delegated to a domain associated with the payment network.

Advantageously, this allows a network to delegate alias based payments to be managed and provided by a third party network associated with a completely different domain.

In an alternative embodiment, the host computing resource is associated with the same domain as the domain as the network identifier. Alternatively, the domain owner may choose to implement the payment service within the network, in which case the endpoint identifier in the service record will be set or updated to refer to the same domain of the network (of digital wallets). Advantageously, the use of the service record to indicate the host or endpoint responsible for the alias based payment service makes it straightforward to add or modify a payment service provider for a digital wallet or a network of digital wallets. Once the service record has been updated, requests or look up searches can continue seamlessly once the new host location has been indicated in the service record.

In accordance with a second aspect, the disclosure relates to a computer implemented method of implementing a payment service for a one or more digital wallets for transactions using a distributed ledger, the method comprising creating a machine readable resource associated with the payment service, wherein the machine readable resource comprises an endpoint identifier for a host computing resource responsible for implementing the payment service for each digital wallet in the one or more digital wallets (or a network), where each digital wallet is associated with an alias. The machine readable resource further includes an entry associated with at least one capability among a plurality of capabilities supported by the payment service. The machine readable resource further includes instructions and/or a specification for accessing a public address or the location or one or more resources for facilitating transactions associated with the alias. The method further comprises providing the machine readable resource at a predictable or known location associated with the host computing resource for the payment service.

In some embodiments, each capability is specified in the machine readable resource as a name and value pair. In some embodiments, the capabilities include one or more of payee entity or payer entity validation for some or all transactions, functions for multiple digital signatures for transactions, payee entity or payment destination approval and/or email based payment transactions, so that a payment client may obtain transaction scripts via email etc.

Advantageously, the second aspect provides a means for discovering one or more capabilities or functions associated with a given payment service that is implemented for one or more digital wallets. Like the first aspect, all that is required by a requesting entity is an alias of the payer or destination entity, i.e. the alias associated with the payee's digital wallet, therefore providing a user friendly and simplified addressing mechanism. This advantage is ensured by the provision of a publically accessible machine readable resource that specifies functions or capabilities offered by the payment service implemented for the digital wallets. This second aspect of capability discovery of a payment service based on a knowledge of only an alias for a payee entity is particularly useful when a payer entity associated with a digital wallet wishes to ensure that a capability or function for the transaction is supported for, when making payments to the alias, before a request to transfer is made. Certain functions may be considered key for facilitating a cryptocurrency payment transaction associated with a distributed ledger, such as locating at least one endpoint identifier associated with the payment service, or implementing a secure communication mechanism based on public key infrastructure (PKI) etc. These functions are in most cases specified separately to the capabilities entry in the machine readable resource. Advantageously the capabilities entry enables provision of a specification, i.e. a record, of all supporting functions that can be availed. For example, details for configuring specific types of validation, additional security for specified types of transactions or networks, levels of encryption, types of PKI architectures supported, levels of addressing etc. may be provided in the capabilities object. Accordingly, a requesting entity can discover and ensure that a required capability associated with the alias is firstly compatible with the requesting entity's resources, and secondly provided for any transactions with the alias by accessing the machine readable resource associated with the payment service of the alias.

In some embodiments, the method of the second aspect includes a step of determining a location for the host computing resource associated with the payment service according to the first aspect and the associated embodiments described above. Accordingly, the endpoint identifier in the machine readable resource is then obtained related to the determined host location.

Advantageously, this embodiment enables host discovery based on a look up of a directory, i.e. DNS for a service record first, followed by capability discovery of one or more functions supported by the payment service. Thus, upon receipt of request for a payment transaction associated with the alias, the service record matching the network identifier in the alias is identified, which is turn provides the location of the host, and in turn enables an endpoint identifier to be obtained. Capability discovery according to the second aspect is then performed based on the endpoint identifier in the machine readable resource.

It will be understood that the method according to the first aspect for host discovery is only one of many host discovery methods that may be performed, before capability discovery based on the machine readable resource is performed according to the second aspect. Thus the first aspect can be performed independently of the second aspect, and vice versa. Although a preferred implementation may include both, host and capability discovery as set out above, this combination is not essential for establishing the capabilities of the payment service associated with the alias. Other methods of host discovery, besides the use of the service record in the first aspect to identify a host location may, also be compatible with the second aspect. For instance, a text based record at a specified network path for the host location may be used, instead of the service record based implementation discussed in the first aspect. Furthermore, host discovery for resolving the endpoint identifier may in some embodiments be skipped altogether for the second aspect, if for example the location of the host is discoverable easily or has been made public, or associated with the same domain as the one or more digital wallets.

Thus, the following embodiments set out are understood to be based on the second aspect alone, or based on a combination of the above discussed first and second aspects.

In some embodiments, in response to receiving a request from a requesting entity for a transaction associated with an alias, the method further comprises steps of identifying the payment service associated with the alias based on the network identifier. Then, based on identifying the payment service, the method includes accessing the machine readable resource from the predictable or known network location. Upon determining if one or more capabilities required for the requested transaction are present in the machine readable resource, the method includes returning an endpoint identifier of the host computing resource for the payment service, and based on this, obtaining a public address associated with the alias in accordance with one or more of the instructions and/or specification in the machine readable resource.

Advantageously, the above embodiments enable obtaining a public address associated with the alias knowing only the alias and no further information to contact the payee entity. Further to determining that one or more capabilities in the machine readable resource conform to one or more requirements of the requesting entity or the transaction, the public address is obtained based on an endpoint identifier from the machine readable resource associated with the payment service. This thereby provides a seamless, simplified and user friendly technique to obtain a public address of an entity having just the alias to start with.

The above embodiment may also be implemented at a requesting client payment entity, i.e. the payer entity making the request for payment. In this case, the method includes sending from a requesting entity a request for a transaction, the request associated with the alias. The method includes accessing the machine readable resource from a location associated with the payment service, wherein the payment service being identified based on the network identifier in the alias, and wherein the machine readable resource is created as discussed above for the second aspect. Then, based on identifying if one or more capabilities required for the requested transaction are present in the machine readable resource, the requesting entity receives an endpoint identifier of the host computing resource for a payment service associated with the alias. The method includes obtaining a public address associated with the alias using one or more of the instructions and/or specification in the machine readable resource.

In some embodiments, each digital wallet is associated with a user or entity registered for the payment service in the network, wherein each digital wallet is a cryptocurrency wallet associated with a public key and a private key of an asymmetric cryptography key pair for transactions on the distributed ledger. In some embodiments, the step of obtaining the public address includes obtaining the public key of the digital wallet associated with the alias. In some embodiments, the public address associated with the alias is based on a cryptographic hash of the public key of the digital wallet associated with the alias. In related embodiments the public key of the digital wallet is an elliptic curve digital signature algorithm (ECDSA) public key, wherein the public key is not part of any transaction previously stored on or posted to the distributed ledger.

In some embodiments related relating to the second aspect of capability discovery, the instructions and/or specification in the machine readable resource comprise the following steps for obtaining a public key associated with the alias. These steps include obtaining a public key infrastructure (PKI) request template from the machine readable resource for a PKI endpoint identifier. Then the alias and the network identifier are to be included in the template in order to generate a complete PKI request, and then a HTTP GET request is sent based on the completed PKI request to obtain a public key associated the alias.

In some embodiments related relating to the second aspect of capability discovery, the instructions and/or specification in the machine readable resource relating to PKI include instructions to check or verify that a public key is still a valid identity key for given payment client. In other words, this embodiment relates to validating the owner of a given public key. In some embodiments, the public key that is to be checked relates to a public key that may have been previously obtained based on the above discussed embodiment, in relation to the same or a different transaction. In some embodiments, the public key that is to be checked relates to one that may have been cached or stored by one or more payment clients for further use. In some embodiments, the verification of a public key may be carried out if a set time period has passed since the public key has been obtained or verified. In some embodiments, this verification may be triggered automatically. The method steps for such verification include obtaining a public key validity request template from the machine readable resource for an endpoint identifier for such verification. In some embodiments, this may be the PKI endpoint identifier discussed above. The alias and the network identifier are to be included in the template in order to generate a complete public key validity request, and then a HTTP GET request is sent based on the completed public key validity request to ascertain that the public key associated the alias is still valid. In some embodiments, in the response to this request that is generated, it is indicated if the public key associated with the alias is indeed correct, i.e. if the public key in the request matches with the current public key associated with the alias, or not by indicating "true" or "false" or "1" or "0".

Advantageously, the above embodiments increases the security, accuracy as well as reliability for the payment service as this ensures that old, disregarded or discarded keys that may have once been associated with a payment client, and validly obtained by an payment entity, for instance based on a PKI request template, is not maliciously used or sent to one or more clients or digital wallets. Such request for public key verification or validation of the owner of the public key can be automatically performed at set intervals, i.e. every 24 hours or on a weekly basis, depending on the importance or sensitivity of transactions intended with the payment entity, or after a certain amount of time has passed from when a public key for a client that is associated with the payment service was last obtained or verified. This automatic or regular verification ensures that only the current keys are used for transactions, and also ensures freshness of information regarding any public keys provided to a payment entity. In other embodiments, the verification may only be performed based on one or more requirements set by the request or the payment entity making the request for verification. Such above discussed embodiment for public key verification is particularly useful where public key for a given alias may change over time. This can be troublesome when one tries to verify data signed using old keys, because even though these old keys may have been securely obtained, such as discussed above, it is not possible to be certain if the obtained public key actually belongs to the right user, i.e. the client associated with the alias.

It is to be understood that although the above mentioned instructions and/or specification are present in the machine readable resource associated with the payment service, the instructions are intended to be performed by one or more computing resources or applications associated with a payment client entity. The one or more computing resources carrying out these instructions may be associated with a payment client application installed in or associated with a digital wallet of the payment client entity.

Advantageously, the provision of the machine readable document associated with the payment service enables making use of the known aliases to generate a suitable request in a specified format to the payment service to obtain a public key of the payee entity, the public key required for signing transaction for a distributed ledger.

In some embodiments, the known or predictable location of the machine readable resource is based on at least one of the endpoint identifier, an Internet protocol communication port used by the payment service and/or a configuration specification of the payment service included in a publically accessible well-known domain repository. Advantageously, the above enables the machine readable resource to be easily located based on either a name of the payment service or the domain name associated with a network identifier.

In some embodiments, the machine readable resource is generated using a Java Script Object Notation (JSON) format. This is advantageous, as JSON is a lightweight data-interchange format which, although primarily being a machine readable language, is also easy for humans to read and write. It is easy for machines to parse and generate, thereby making it an ideal data-interchange language for generating the machine readable resource.

In a third aspect, the present disclosure provides a technique for payment destination addressing. This third aspect is related to the second aspect of capability discovery, as the machine readable resource is used for resolving addressing the payment destination, i.e. for sending payment. Optionally, the third aspect may include the first aspect of host discovery as well, although this is not essential as other means of host discovery may also be used in combination with the third aspect of the present disclosure.

The third aspect of the present disclosure provides a method where the step of obtaining the public address associated with the alias in the second aspect discussed above, further include the steps of obtaining a payment destination of a payee entity associated with an alias, the payment destination for use in constructing a transaction for making a cryptocurrency payment from a payer entity to the alias. The step of constructing the transaction according to the third aspect comprises, accessing the machine readable resource based on identifying the payment service. This is followed by returning a payment destination endpoint identifier based on the one or more instructions and/or specification in the machine readable document. Payment details for the transaction from the payer entity are then obtained, the payment details including at least an alias associated with the payee entity's digital wallet and an amount of cryptocurrency to be paid to the payee. A digital signature for associating the payment details with a cryptographic key for the payer entity is then obtained. An output script associated with the payment destination endpoint identifier associated with the alias is then generated for provision to the payer entity. The output script is provided for embedding in a payment transaction for the distributed ledger.

Advantageously, the third aspect enables receipt of an output script for the digital wallet associated with the alias to be obtained, thereby automatically enabling construction of a transaction that is in a suitable format for including on the digital ledger. This is based on knowledge of just the alias for the payee, and the remaining details are established from the machine readable resource associated with the host responsible for the payment service. Furthermore, enabling provision of an output script ready to be included in the transaction with knowledge of the alias alone provides an overall simplified, seamless, efficient, automatic, easy to implement and a user friendly alias based technique of payment addressing for digital wallets.

The method of the third aspect may also be implemented at or by a payment client entity, such as the digital wallet or an application or processor associated with the payment client entity that requests for the transaction. In this case, the method of constructing the transaction comprises sending from a payer entity a request for a transaction, the request associated with the alias. The method includes accessing the machine readable resource from a location associated with the payment service, and receiving a payment destination endpoint identifier based on the one or more instructions and/or specification in the machine readable document. The payer entity then provides payment details for the transaction, the payment details including an alias associated with the payee entity's digital wallet and an amount of cryptocurrency to be paid to a payee entity. The method includes providing a digital signature for associating the payment details with a cryptographic key and receiving an output script associated with the payment destination endpoint identifier associated with the alias. The output script is then embedded in a payment transaction for the distributed ledger.

In some embodiments, the method of the third aspect includes obtaining a payment destination request template from the machine readable resource for a payment destination endpoint identifier. The alias and the network identifier are then to be included in the template to generate a complete payment destination request. A HTTP POST request is then generated based on the complete payment destination request to obtain the payment destination endpoint identifier associated with the alias.

It is to be understood that although these instructions are present in the machine readable resource associated with the payment service, the instructions are also intended to be performed by one or more computing resources or applications associated with a payment client entity. The one or more computing resources carrying out these instructions may be associated with a payment client application installed with or associated with a digital wallet associated with the payment client entity.

Advantageously, the provision of the machine readable document associated with the payment service enables making use of the known alias to generate a request in a specified format to the payment service to obtain a payment destination endpoint identifier or URI, so that this may be used in construction of a transaction for the distributed ledger.

In some embodiments, the public addresses of the alias and the payer entity each include a public key of a respective digital wallet associated with the payee entity and the payee entity, and wherein the digital signature is used for verifying the identity of the payer entity requesting the transaction. In some related embodiments, the digital signatures associated with both, the payer entity and the payer entity are required for verification of each respective entity, before the transaction is stored or posted on the distributed ledger.

In some embodiments, the alias is referred to as a payment handle associated with a digital wallet in the network.

In a fourth aspect, the present disclosure provides a technique for validating a payment client, i.e. the payer entity that wishes to make a cryptocurrency payment to another payment client, i.e. a payee entity. The fourth aspect is related to the second aspect of capability discovery, as the machine readable resource of the second aspect is used for implementing payment entity validation. In some embodiments, the fourth aspect is related to the third aspect of payment destination addressing, and provides additional or related techniques for implementing payment destination addressing.

The fourth aspect relates to a computer implemented method of implementing a payment service for one or more clients for transactions associated with a distributed ledger, such as the Bitcoin blockchain. In a first implementation, the method is performed by one or more processors associated with a payment service. The method includes updating a machine readable resource associated with the payment service. This machine readable resource in some embodiments, is as discussed above in relation to the second aspect, and is provided at or accessible from a predictable or well-known location associated with the payment service. Thus, as discussed in the second aspect, the machine readable resource includes at least one identifier associated with a host computing resource that is responsible for implementing the payment service for each client among the one or more clients, each client being associated with an alias, where the alias is specific to the client. The machine readable resource also includes an entry associated with at least one capability supported by the payment service, where each capability is associated with a protocol or instructions for implementing the respective capability for clients of the payment service. The machine readable resource also includes instructions and/or a specification for accessing or obtaining a public address associated with the alias, the public address used for facilitating transactions associated with the alias.

In the fourth aspect, the step of updating the machine readable resource comprises adding at least one further capability supported by the payment service, where the at least one further capability includes: validation of a payer entity requesting for a payment destination of an alias for a given client among the one or more clients being associated with the alias, and/or asynchronous processing of a request from a payer entity, the request being associated with a payment destination of an alias for a given client among the one or more clients being associated with the alias.

The fourth aspect provides all the advantages associated with the second aspect discussed above for discovering one or more capabilities or functions associated with a given payment service that is implemented for one or more clients, where each may be associated with digital wallets in some embodiments. Like the second aspect, all that is required by a requesting entity, i.e. a payer entity, is an alias associated with a payee's digital wallet, therefore providing a user friendly and simplified addressing mechanism, and providing a record of all supporting functions or capabilities that can be availed, or are supported by the clients associated with the payment entity in a manner which can be easily discovered by any entity that wishes to engage in a transaction with such clients.

A further advantage provided by the first implementation of the fourth aspect is the ease in providing or adding one or more new capabilities that are to be supported by the payment service. By updating the machine readable resource that is provided at the predictable or well-known publically accessible location associated with the payment service, new capabilities that are added can automatically rolled out or made applicable for all clients of the payment service, and a requesting entity will be able to establish that such new capability is now supported as and when the machine readable resources is accessed. Thus a new or updated capability can be straightaway discovered and applied for processing one or more requests that pertain to future transactions with one or more payment clients that are associated with the payment service.

In some embodiments, in addition to the added or further capabilities discussed above, there may be an indication to specify if the further capability or indeed even the originally created capabilities are true (on or 1) or false (off or 0). This toggle functionality is advantageous, as it enables a payment service to either enforce or not enforce one or more of the capabilities specified in the machine readable resource for certain types of transactions, or to set this enforcement value accordingly for certain durations. Thus, any payment entity, such as the payer entity will be able to check if a particular capability is actually enforced for the type of transaction that is pertaining to the request, or at the time that the request is being made. If, for instance, the requesting payment client, i.e. the payer entity in this case, is one that does not support or cannot respond to messages or instructions concerning such capability, the request may be withdrawn or simply not sent.

A second implementation of the fourth aspect is also performed by one or more processors associated with a payment service. Here, a computer implemented method of implementing a payment service for facilitating transactions associated with a distributed ledger is provided, wherein an alias is provided for a client among one or more clients associated with a payment service, the alias being specific to the client. The method comprising the steps of receiving a request associated with an alias from a payer entity, the request pertaining to a payment destination of a payee client among the one or more clients associated with the payment service, where the payee client being associated with the alias in the request. In some embodiments, this request is a HTTP POST request that is generated based on the description in relation to FIG. 6 above using a payment destination template. The method then includes validating the payer entity based on at least one capability supported by the payment service. Here, the at least one capability is identified using a machine readable resource associated with the payment service. In some embodiments, the steps of how the machine readable resource may be accessed and how supported capabilities may be discovered and implemented are in line with the second aspect that is already discussed above. Thus, in some embodiments, the at least one capability may be one that is originally created based on the second aspect, or may be a further capability that has been added based on the first implementation of the fourth aspect discussed above. The step of validating of the method includes obtaining a public key associated with the payer entity. In some embodiments, this step may be based on the instructions and/or specification in the machine readable resource for PKI, such as discussed in relation to FIG. 4 above, i.e. by sending a HTTP GET request. The method includes the step of determining, based the request from the payer entity, if a predefined condition is satisfied. In some embodiments, the predefined condition may be a single condition or may be plurality of conditions that are to be satisfied.

If it is determined that the predefined condition is satisfied, then the payer entity is considered to be valid, i.e. payer entity validation has been successful. In some embodiments, this validation may include validating or confirming the identity of the payer entity. In some embodiments, this validation may include validating or confirming the validity of the request in addition to the identity of the payer entity. The method then includes the step of generating an output script associated with the payment destination of the payee client associated with the alias. In some embodiments, the generation of the output script is in association with the alias of the payee, and may be generated in a manner as described above in relation to FIG. 5*a* (see the discussion above in relation to step 512*a* of this figure). Once generated, the output script is provided to the payer entity for embedding in a transaction for the distributed ledger, the transaction to be constructed for the distributed ledger based on this output script.

In some embodiments, it may be that it is determined that the predefined condition (or one or more of such conditions) is not satisfied. In this case, the method comprises generating a response rejecting the received request from the payer entity because the payer entity has not been validated, as enforced by the capability in the machine readable document. In some embodiments, this rejection response is sent to the payer entity, while in other embodiments the rejection response is simply generated for a record and not sent. In this case, the request may simply remain unanswered or unauthorised.

In addition to the advantages associated with the second and the third aspect above, the above described method of the second implementation improves security and reliability for payment clients or entities associated with a payment service that supports or enforces a payer validation capability, when dealing with requests for a payment transaction from another entity, i.e. the payer entity. This is because the payer entity has to be validated based on at least one predefined condition to establish the authenticity of the requesting payer entity, i.e. by verifying the identity, and accordingly validating the request send by the payer entity.

Thus, payment clients of a payment service may be certain that the request is genuine and has indeed originated from the payer entity, and not from any other malign party or entity.

In some embodiments, the request includes a timestamp indicating the date and time at which the request was sent by the payer entity and/or a digital signature associated with the public key of the payer entity and/or a one-time token. At least one of the above are present in the request. In some embodiments, the digital signature is always present, along with either the timestamp or the one-time token. In some cases, both the timestamp and the token may be are present in the request that is signed with the digital signature.

In some embodiments, when the timestamp is present in the request, the predefined condition includes verifying that the timestamp included in the request is within a predefined duration of the time of receipt of the request by the payment service associated with the payee client. In some embodiments, the predefined duration is up to 2 minutes. This 2 minute duration is selected to allow a reasonable delay buffer for any synchronisation issues between clocks in different entities. It will be understood that this duration is not limited to 2 minutes, and may be more, depending on the required application and implementation. Usually, 2 minutes is an acceptable time-difference buffer, and may in some cases be less if the application or implementation is one of a particularly important or time-sensitive nature. The time and date may be recorded by a clock associated with either entity to record the date/time of sending/receiving.

In some embodiments, when the digital signature is present in the request, the predefined condition includes verifying that the digital signature in the request corresponds to the obtained public key of the payer entity. In some embodiments, this includes checking that the signature in the signed request can be verified or checked based on the obtained public key. In some embodiments, the signature is applied based on a private key of an asymmetric or cryptographic key pair for the payer entity, and which can be validated or deciphered using only the public key of the same key pair. In some embodiments, the verification may also include checking to see if the public key is still a valid identity key for the payer entity, rather than an old or an unused key. This may be relevant when the public key may have been obtained some time ago, or if the public keys are periodically changed but the key was obtained just before the change takes place.

In some embodiments, when the one-time token is present in the request, the predefined condition includes verifying that the token has not been used in any earlier request. In some embodiments, this includes maintaining a record of all one-time tokens that have been included in earlier requests, so that this record may be used to establish that that a token in a current request has not been previously used. For example, a scheme for issuing single-use tokens may be to monotonically increment a counter each time a token is issued may be used.

The above embodiments advantageously require that requests include either one or more of a signature, a timestamp and/or a one-time token from the payer entity, so that these may be used to validate the payer entity, as well as the message, i.e. the request, that is sent from this entity. Advantageously, by verifying the signature to check that this can be deciphered or verified using the public key of the payer entity that is already obtained, the payment service is able to confirm that the origin of the request is indeed the payer entity. Thus identity of the payer entity can be validated.

Advantageously, by verifying that the timestamp of the request is within the predefined duration, security and reliability is further increased by limiting the scope of message replay attacks. Message replay attacks or Man in the Middle attacks may occur when a malign party intercepts and attempts to relay the same message one or more times to confuse a destination or a payee client or indeed a payment service that the message is being sent from the payer entity rather than a malign party, thereby prompting the payee client or payment service to respond to the message, which may go to or provide access to the malign entity rather than the genuine payer entity that originally sent the message. For example, a simple application login screen implementation might capture credential information like a username and password from a user. If this data was captured, an attacker could log in to the application as the user by simply re-presenting the captured credential information at some later point in time. As the username and password are both still valid, the attacker will be granted access. Thus, in the present disclosure, by checking that the timing of receipt is within a small duration of the timestamp in the request itself, this narrows the window during which captured requests can be successfully replayed and can thus mitigate this style of attack such attacks may be prevented or if they occur, they can be easily detected. Advantageously, verification based on a one-time token ensure that a given request is processed one-time only. Thus, if a request is captured, but it is detected the request has already been processed, subsequent replays of that request can be rejected. For instance, referring again to the example of a user logging in, each time the user accesses the login page of a web application, a one-time-use token may be embedded as a hidden field alongside the username and password fields, such that any duplicate or subsequent requests featuring the same one-time-use token. Thus, malign parties will not be able to guess a valid token through brute force trial-and-error, for instance. In embodiments where such one-time or single-use tokens are incremented using a counter each time a token is issued; such counter may be a sequence or a serial number.

Advantageously, by combining the one-time-use token with the timestamp and the digital signature presents an attacker with multiple obstacles when performing a replay attack. Not only must the attacker capture and record a valid request, the attacker will now also need to prevent the initial request from being processed. If the original request is processed, the one-time-use token is burned, i.e. used up and no longer valid, and a replay will not work. This, in addition to the verification based on the timestamp, as well as the digital signature prevents that them from altering the message, makes a replay attack very hard to successfully implement by the malign party.

In some embodiments, the step of sending the output script includes applying a digital signature associated with a public key of the payee client to the output script, and sending the signed output script to the payer entity. Advantageously, by signing the output script based on a key or cipher that relates to the payee entity's public key prevents tampering of the output script associated with the payment destination requested. In some embodiments, this includes applying a signature using a private key of an asymmetric or cryptography key pair for the payee entity, such that the signature can only be verified or deciphered using the public key belonging to the same key pair.

In some embodiments, the payer entity is associated with a payment service that is different to the payment service of the payee client, and is assigned an alias associated with the different payment service, the alias being included in the request from the payer entity. In other embodiment, the payer entity is associated with the same payment service as the payment service of the payee client, and is assigned an alias associated with the same payment service, the alias being included in the request from the payer entity.

Although it is not essential for the implementation of the fourth aspect for the payer entity to be associated with a same or different payment service as that of the payee entity's payment service, if it is so associated, then this has the advantage of also being accessed based on simply the alias (as explained in relation to the above first to third aspects), for discovering public addresses and any capabilities supported by the payer entity. For instance, the HTTP GET request as set out in FIG. 4 can then be used, as this makes use of the PKI templates in a machine readable resource of the payer entity's payment service, for obtaining and verifying the public key associated with the payer entity.

According to a third implementation of the fourth aspect of the present disclosure, the method related to payer validation as explained above may be implemented in relation to a requesting client payment entity, i.e. the payer entity making the request in this case. The method includes, generating a request associated with an alias, the request pertaining to a payment destination of a payee client among one or more clients associated with the payment service, the payee client being associated with the alias in the request. The method includes applying a digital signature associated with a public key of a payer entity to the generated request to obtain a signed request. In some embodiments, this includes signing the request with a private key of an asymmetric key pair for the payer entity, where the signed request may be obtained or verified or read using the public key of the same pair. The method further includes accessing a machine readable resource associated with the payment service of the alias. In some embodiments, such access is made based on the alias of the payee client, as set out in relation to the second aspect. The method includes sending the signed request based on one or more instructions and/or specification in the machine readable resource pertaining to the payment destination, where the request includes a timestamp indicating the date and time of sending. In some embodiments, the request may be a HTTP POST request based on the payment destination template, as discussed in relation to the third aspect in FIG. 6, when implemented by the requesting payment entity. The method then includes receiving an output script associated with the requested payment destination, and embedding the received output script in a transaction for the distributed ledger, the transaction associated with the payer entity and the payee client.

Figure 4:
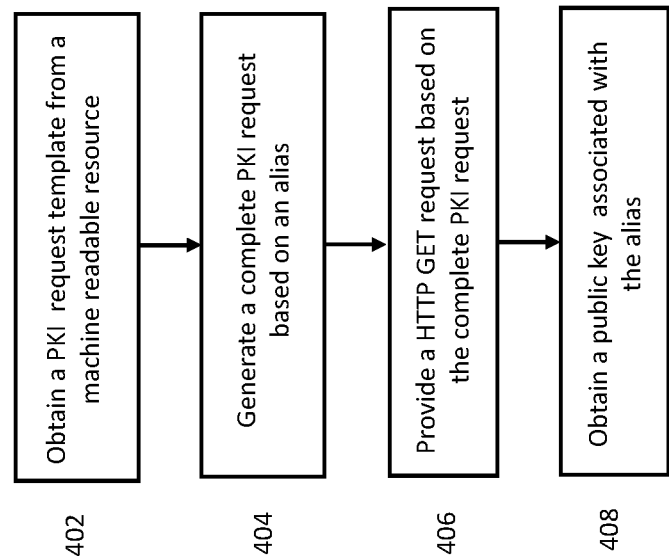
FIG. 4 is a flow diagram depicting a public key infrastructure sequence.

In some embodiments, the received output script includes a digital signature that is based on a public key associated with the payee client, and wherein the method includes verifying the signature by firstly obtaining a public key of the payee client using a HTTP GET request, such as explained in relation to FIG. 4, and then verifying that the digital signature can be validated or deciphered using the obtained public key, thereby advantageously verifying that the message originated by the payee entity and that the output script is genuine and may be used to construct the transaction.

In a fifth aspect, the present disclosure provides a technique for implementing asynchronous processing of a request for a payment destination that is associated with an alias, the request being sent from a payment entity, i.e. payer entity in this case, to a payment service associated with alias, i.e. this alias being associated with a payee client. Asynchronous processing of the request may be considered to include delayed processing or discontinuous processing of the request, when a response in relation to the request is not provided immediately, or within a short time of a receiving a request. This also covers situations when processing may take place out of order, i.e. when perhaps requests from a payment entity are processed in an order that is not the same as the order in which the request is received. The term asynchronous processing is therefore used hereinafter to cover all of the above situations, where processing of a response to a request is not in sync with the timing of the receipt of the request. In some embodiments, such asynchronous processing may be applied when a response or action is compulsorily required from a payment entity, when such entity is unavailable or is offline, i.e. not connected to a communication network used for the transfer of requests, responses and messages, such as the Internet. The fifth aspect is related to the second aspect of capability discovery, as the machine readable resource of the second aspect is used for implementing a capability enabling such asynchronous processing for payment clients associated with the payment service. The fifth aspect is in some implementations also related to the third aspect of payment destination addressing, and provides additional or related techniques for implementing payment destination addressing, but asynchronously. In some embodiments, the methods in respect of the fourth aspect relating to payer validation may also be included in the fifth aspect.

The fifth aspect relates to a computer implemented method of implementing a payment service for one or more clients for transactions associated with a distributed ledger. In a first implementation, the method is performed by one or more processors associated with a payment service, and relates to a method of implementing a payment service for transactions associated with a distributed ledger, wherein an alias is provided for a client among one or more clients associated with a payment service, the alias being specific to the client. The method comprises the steps of receiving a request associated with an alias from a payer entity, the request pertaining to a payment destination of a payee client among the one or more clients associated with the payment service, the payee client being associated with the alias in the request. In some embodiments, this request may be a HTTP POST request based on a payment destination template associated with the payment service, such as discussed in related to FIG. 6. Implementing asynchronous processing of the request in the present aspect is based on at least one capability supported by the payment service, the at least one capability identified using a machine readable resource associated with the payment service. In some embodiments, the capabilities are created or provided in accordance with the second aspect discussed above, using the machine readable resource accessible from a predictable or well-known location associated with the payment service. The at least one capability may be one that is originally present upon creation of the machine readable resource, or may be one of the further capabilities that have been included, as discussed above in relation to the first implementation of the fourth aspect that may apply for the fifth aspect.

The step of implementing asynchronous processing includes generating a token that is specific to the received request. In some embodiments, this token serves as an acknowledgement of receipt of the request relating to the payee client. In some embodiments, the token also serves as an identifier for the request, such that it may be used to refer to or call back such request. The token is then sent to the payer entity. In some embodiments, the method includes sending a notification of receipt of the request to the payee client, i.e. associated with the payment destination to which the request pertains to. This notification may be sent to a messaging or mailbox application of a digital wallet or a user device associated with the payee client, where such notification may be sent even if and when the payee client is offline or unavailable or unresponsive, i.e. not connected to the Internet, or is simply switched off. In some embodiments, whenever the payee client is operational or online and is able to respond, this response either approving or rejecting the request is received by the payment service. In some embodiments, if no response is received by the payee entity by a predefined period, which may be for instance 24 hours or 2 days or the like, then a response similar to a rejection, such as an unresponsive or unauthorised response is considered to have occurred. The remainder of the steps of the fifth aspect are performed based on the response received.

Responsive to receiving an approval of the request as a response from the payee client, the method of the fifth aspect includes the step of generating an output script associated with the payment destination of the payee client that is associated with the alias. In some embodiments, this output script may be generated in a manner as described in relation to FIG. 5a of the third aspect, especially in relation to step 512a. The method then includes generating a call-back request, the call-back request includes the token and the generated output script, the output script associated with the payment destination of the payee client. The call-back request is then sent to the payer entity. In the call-back request, the token is provided so that the output script can be correctly correlated with the respective request that was made pertaining to the payment destination in the output script. The output script in the call-back request is provided for embedding in a transaction for the distributed ledger.

In some embodiments, if a rejection of the request is received, or upon expiry of the predefined period set out above where no response is received from the payee client, the method comprises generating response rejecting the received request. In some embodiments, the generated response is not sent to the payer entity and the token for the request is then simply discarded. In other embodiments, a call-back message is generated based on the token and the rejection response, and this is sent to the payer entity to inform the payer entity that the request pertaining to the token has been rejected. In both cases, no output script is generated.

Advantageously the implementing such asynchronous processing of the request provides a means for a seamless and accurate discontinuous or delayed processing flow for the request. This technique can be particularly useful for implementations or situations where a response from the destination, i.e. the payee client in this case, is required to proceed, but where the payee client may not be operational or able to provide such response. Thus, the above technique enable request to still be is processed accurately, even when the payee client is offline or unresponsive. This is achieved by generating the token as set out above, and further associating this token to a request. By sending a call-back that is based on this same token for the request in question, it is ensured that the output script will be correctly associated with a transaction that pertains to the request, no matter the length of time that has passed from when the request was sent from the payer entity or from when the response was received from the payee entity. Furthermore, no matter how many other requests may have been provided from the same payer entity to the same or different payee client that is associated with the same payment service, or in what order they were sent before any response is received, the token in the call-back request will ensure that the output script is accurately and seamlessly correlated with only the one request that it relates to, or is in response to. Thus, in spite of a delay or interruption in processing the request, the processing is completed accurately and seamlessly as if there was no delay or put of sync flow at all. Thus, advantageously payment clients of payment services that include and enforce such a capability of asynchronous request processing will benefit from a seamless and reliable processing even they are non-operational or offline or unavailable at the time a notification of the request is received.

In some embodiments, the step of implementing or commencing asynchronous processing of the request by generating the token may be performed for all requests that are associated with a payee client. This implementation is advantageous, as a token is always returned as an acknowledgement first to the payer entity, whether the payee client is online or office, so that there is a record of this request associated with the token. In some embodiments, if a response from the payee client approving the transaction is received almost immediately, for instance within a predefined duration of 10 seconds, the call-back request may be straightaway returned. In this case, the token may in some embodiments still be generated to maintain a record of the request, but may or may not be sent with the call-back request that includes the output script, or indeed the rejection response, as applicable. In some embodiments, the token may not be generated if the response from the payee client is received within the predefined duration, in which case the request/response flow is synchronous, and the call-back request may include the output script. Advantageously, this embodiment saves computing and network resources that are involved with sending the token separately, when it is already established that the payee client is online and that the approve/reject response has already been received.

Both implementations above have the advantage of enabling asynchronous processing associated with a token. The later implementation will be beneficial only if the predefined duration is very small, for instance within or less than 10 seconds. This protects payment services or payment entities against any malign parties implementing a message replay attack. This is ensured by generating the token immediately or soon after the request is received at the payment service.

In some embodiments, the step of sending the token and/or the step of sending the call-back request includes applying a digital signature associated with a public key of the payee client to the token to obtain a signed token, or to the combination of the output script and the token in the call-back request to obtain a signed call-back request, the signed token or call-back request being returned to the payer entity. This advantageously increases the security by protecting the integrity of the contents of the token as well as the call-back request from being tampered with when in transmission, and at the same time serves to confirm the identity of the payee client based on its public key. In some embodiments, the digital signature is applied to either the token or the call-back request based on a private key of an asymmetric key pair of the payee entity, where only the public key of the same key pair can be used to obtain or use, i.e. decipher or decrypt, the contents of any message signed by the private key.

In some embodiments, the payer entity is associated with a payment service that is the same as, or different to, the payment service of the payee client, and is assigned an alias associated with the payment service, the alias being included in the request from the payer entity. Like the fourth aspect, it is not essential for the payer entity to be associated with a same or different payment service as that of the payee entity's payment service.

Figure 6:
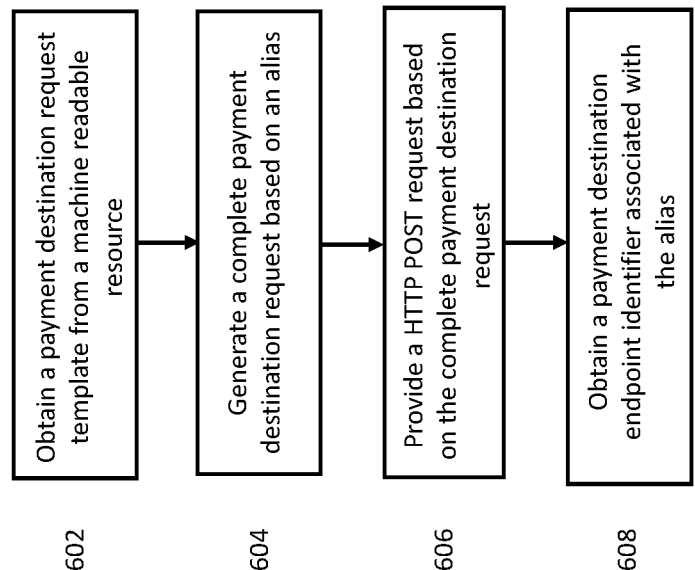
FIG. 6 is a flow diagram depicting a payment destination endpoint resolution sequence.

Any entity configured to be able to access and transfer cryptocurrency, even those that do not have a digital wallet implemented, can make the request as a payer entity. However, if the payer entity is so associated, then the payer entity has the advantage of also being accessed based on simply the alias (as explained in relation to the above first to third aspects), for discovering public addresses and any capabilities supported by the payer entity. For instance, in some embodiments the method can make use of a HTTP GET request based on the payer entity's payment service, for obtaining and verifying the public key associated with the payee client, as set out in FIG. 4. Similarly, if the payer entity is associated with a payment service, then the call-back request can be a HTTP POST request that is based on a payment destination request template, the token, and the alias of the payer entity, wherein this payment destination request template is obtained by accessing a machine readable resource associated with the payment service of the payer entity, such as explained in relation to FIG. 6. For asynchronous request processing, the addition to the HTTP POST request in FIG. 6 is that the capabilities in the machine readable resource will also include or make provision for including the token in the payment destination template. Thus advantageously, the payer entity may also be contacted using just the alias, as discussed in the second aspect.

According to a second implementation of the fifth aspect of the present disclosure, the method related to asynchronous processing set out above may be implemented in relation to, or for a requesting client payment entity, i.e. the payer entity making the request. In this case, the method includes generating a request associated with an alias, the request pertaining to a payment destination of a payee client among the one or more clients associated with the payment service, the payee client being associated with the alias in the request. The method includes sending a request based on one or more instructions and/or specifications accessed from a machine readable resource pertaining to the payment destination, the machine readable resource associated with the payment service. In some embodiments, such access is based on techniques discussed above in relation to the second aspect. The method includes receiving a token from the payment service, the token being specific to the request and associated with a digital signature. The method includes verifying that the digital signature associated with the token relates to a public key of the payee client. As discussed above, the signature in some embodiments is applied using a private key of an asymmetric key pair of the payee client, such that the token can only be validated or deciphered using the public key of the pair. Responsive to verification being successful, the method includes updating a record associated with the request based on the token. In some embodiments the record may be associated with the payer entity itself, or a payment service associated with the payer entity, or may be based on a record stored remotely on a device or cloud associated with the payer entity. The method comprising receiving a call-back request, the call-back request including the token and an output script associated with the requested payment destination, the call-back request associated with a digital signature. The digital signature may be as explained above for the token. The method includes verifying that the digital signature associated with the call-back request corresponds to the public key of the payee client, and responsive to this verification being successful, further includes correlating the token in the call-back request with the updated record. Once correlated with the correct request, the output script in the call-back request is then embedded in a transaction for the distributed ledger, the transaction associated with the payer entity and payee client.

The advantages discussed above for the first implementation of the fifth aspect apply equally to the second implementation. In addition, given that a token specific to the request is provided to a payment client, such as a payer entity, this entity is advantageously able to easily locate the request pertaining to the transaction that originated from the entity, even if many other messages have been sent/received by it before a response relating to the respective request is received, and without having to search a list or collection of transactions or messages.

In some embodiments, the received token or call-back request includes a digital signature associated with a public key of the payee client, and the step of verifying the digital signature obtaining the public key, and checking that this obtained public key corresponds to the public key used verify the signed token and output script. In some embodiments, the step of obtaining the public key is based on sending a HTTP GET request using a public key infrastructure (PKI) request template in the machine readable resource, as set out in relation to FIG. 4.

In some embodiments, the method may further include the method steps that are implemented by or associated with the capability relating to payer validation as implemented by the payer client, according to the third implementation of the fourth aspect discussed above.

According to a third implementation of the fifth aspect of the present disclosure, the method related asynchronous processing set out above may be implemented in relation to a destination payment client, i.e. the payee client to which the request is directed to. The method in this case includes receiving by a payee client, a notification of a request associated with an alias, the request pertaining to a payment destination of the payee client among the one or more clients associated with a payment service, the payee client being associated with the alias in the request. When the payee client is online or able to respond to the received request, as the request requires such input from the payee to be processed, the payee client may approve or reject the request and sends a response to the payment service based on said approval or rejection.

In some embodiments, the notification may include details of the request, such as an indication of the requesting payment client, type and/or amount associated with a requested transaction. In some embodiments, the notification may be presented to the payee client on a computing device or display terminal associated with a digital wallet of the payee client. In some embodiments, the method may include interacting with or entering data for approving or rejecting the request on a user interface of the computing device or display terminal. In some embodiments, the approval or the rejection may be provided automatically by the payee client without requiring interaction or any explicit action to be taken at the computing device. In some embodiments, the payee client may include or be associated with one or more records or lists for allowing or disallowing requests associated with certain properties or payer entities or payer entity aliases. For instance, if the request is from a payer entity that is in a whitelist, then as soon as the payee client is online, the whitelist is checked and the approval is sent. Similarly, if the payer entity is in a blacklist, then a rejection is automatically sent. It is possible for the lists to be associated with other properties of the request, such as the type of request or the amount, etc. Once the response is provided, processing of the request is proceeded with, as per the first and/or second implementations of the fifth aspect.

An example scenario related to the fourth aspect includes a method associated with a transaction for a distributed ledger comprising the steps of sending a request from a payer entity to payee entity, the request including or addressed to an alias for the payee entity. Here, the request is received by a payment service associated with the payee entity. The payment service validates the payer entity based on a timestamp and a signature included in the request. Responsive to successful validation, an output script associated with the payee entity is sent to the payer entity for creating a transaction based on the output script, this transaction to be posted to the distributed ledger.

An example scenario related to the fifth aspect includes a method associated with a transaction for a distributed ledger comprising the steps of sending a request from a payer entity to a payee entity, the request based on an alias for the payee entity. Here, the request is received by a payment service that is associated with the payment entity. An acknowledgment of receipt of the request in the form of a token is provided to the payer entity. A notification regarding the request is provided to the payee entity. When the payee entity is online or is available, the payee entity approves or rejects the request in the notification by interacting with a user interface. Responsive to an approval from the payee entity, an output script associated with the payee entity is sent to the payer entity for creating a transaction based on the output script, the transaction to be posted to the distributed ledger.

A further aspect of the present disclosure relates to a method for configuring a prefix for requesting a payment transaction from a requesting entity to an alias associated with a digital wallet in the network, such that responsive to receipt of a request from the requesting entity that includes the prefix and the alias, one or more of the above discussed first to fifth aspects of the disclosure may be automatically performed by the payment service based on the alias.

Advantageously, this further aspect enables automatically triggering the above described aspects and embodiments simply upon presentation of a prefix, such as "payto:" or "bsvto:" for example, followed by the alias of the payee entity that is known to the requesting entity. This prefix advantageously enables the request for a payment transaction to be generated and sent to the payment service based on one or more of the above discussed aspects and embodiments. All that the requesting entity need to do is add the known alias to the prefix.

The disclosure also provides a computing device, comprising: a processor; and memory including executable instructions that, as a result of execution by the processor, causes the computing device to perform any aspect or embodiment of the computer-implemented methods described herein. The disclosure also provided a system includes a plurality of such computing devices that are operable together to implement any aspect or embodiment discussed above.

The disclosure also provides a non-transitory computer-readable storage medium having stored thereon executable instructions that, as a result of being executed by a processor of a computing device or system, cause the computing device or system to at least perform one aspect or embodiment of the computer-implemented methods described herein.

Some specific embodiments are now described by way of illustration with reference to the accompanying drawings, in which like reference numerals refer to like features.

FIG. 1 relates to the first aspect of the disclosure and depicts a method of implementing a payment service for one or more digital wallets that are associated with an alias. In FIG. 1, the method is understood to be implemented by one or more processors that are associated with the provision of a payment service. In this disclosure, the payment service may be one or more executable rules or protocols that perform the below described functions. The wallets may be in a network of digital wallets or may be individual stand-alone cryptocurrency wallets for transactions associated with a distributed ledger. For example, the method may be implemented in a network of Bitcoin wallets for BSV cryptocurrency. For simplicity of explanation and ease of understanding, an alias associated with a digital wallet in a network of digital wallets will be referred to henceforth in the description of the figures. However, as explained above the disclosure is not in many ways limited to the digital wallet being connected to other wallets in the network.

Step 102 relates to assigning or providing an alias for a given digital wallet in a network of digital wallets. This relates to providing a mapping or correlation of aliases with the respective public addresses associated with the digital wallets, so that the aliases can be used instead of the public addresses. Such assignment may be made when a particular payment client or entity signs up to the network, for example. At this point an "alias: public address" pair may be provided for each wallet. The alias is unique for a particular wallet and either includes a network identifier, such as the domain name of the network, or a name that identifies that network. For example, the alias may be in the well-known email format, such as clientname@domainname.com, where the clientname may simply be the name or an identifier of the individual or company that signs up for or registers with the network of digital wallets, like Alice or Bob. The domain name indicates an organisation or domain owner, for example "nChain". In this case, the alias for Alice would be alice@nchain.com. If Bob signs up to a different network of digital wallets that may have a domain name "notnchain", which also implements one or more aspects and/or embodiments of the disclosure, Bob's alias may be assigned as bob@notchain.com. Other alias formats may also be used, such as AliceNC or BobBSV etc., as long as the alias is associated with a network identifier.

Step 104 relates to creating a service record for the payment service based on the network identifier in a directory. This step is needed for associating aliases with network identifiers that provide a payment service in the directory. The directory referred herein is usually a decentralised directory that is open, i.e. accessible publicly by all users. For example, a global directory such as the DNS can be used, which is decentralised and open such that it is accessible by any entity or users from anywhere over the Internet. While the open, accessible and decentralised directory is a preferred implementation, the present disclosure is not limited to this. In some embodiments, the directory referred may also be a centralised directory. In other embodiments the directory may be a closed directory, i.e. one that is accessible to users or entities registered with a network or service. Henceforth, a reference to a global directory such as the DNS will be in the description for ease of explanation. It will be understood by a skilled person that other types of directories are also within the scope of this disclosure.

For instance, when an alias is provided in an input or a request in the above discussed format, the directory such as the DNS is searched (c a DNS look up) to identify if payments can be made using the alias. If an alias associated with a network or domain that does not support an alias based payment service is input, this situation may be handled using one, or a combination, of the following implementations. In one implementation no result will be returned by the DNS indicating that payments using the alias cannot be made. If no service record exists, then the request-ing entity will have to obtain the public address by other known techniques before any transaction associated with the distributed ledger can be made. In another implementation, for example when the service may be provided by the dame domain as the network identifier, the result returned may be a location of a host responsible for the network or domain associated with the alias. For instance, based on the example discussed above, if no service record for a payment service associated with the network identifier in the alias exists in the directory, then a location or URI for a host responsible for the domain "nchain" may be provided, or the requesting entity may be directed to the host for the domain "nchain". Thus, the host responsible with the domain indicated in the alias may deal with the request further.

Step 106 relates to updating or including in the service record created in step 104, an entry or field to indicate the payment service that is provided by the network or domain associated by the network identifier. Updating the service record in the DNS indicates that a particular network iden-tifier, such as nchain.com provides or uses a certain payment service, for example one that is identified as "bsvpay" or "bsvalias", for instance. This step of updating indicates to the entity performing the DNS lookup that the identified payment service, i.e. considering "bsvalias", enables pay-ment transactions to be made for an alias associated with the nChain domain.

Step 108 relates to updating the service record to indicate a location for a host computing resource responsible for the payment service indicated in step 106. Therefore, if the payment service was associated with a different network or domain to the digital wallet's network, then this entry in the service record would point to the web server location or IP address of the host computer or server responsible for the service. Following on from the above example, if the bsvalias payment service was associated with a separate network or separate domain (bsvalias.com), then the loca-tion or instructions for locating the host server for bsvali-as.com is indicated in the service record. This is to identify where the host computing resource that is configured to facilitate identification of the digital wallet associated with the alias can be found.

An example of a service record (sry record) in the DNS defining the location of servers for specified services is seen below:

A service record for the domain name (nchain) relating to the payment service (bsvalias) may be in the below form, with fields or entries such as:

service: the symbolic name of the desired service.

proto: the transport protocol of the desired service; this is usually either transmission control protocol TCP or User datagram protocol UDP name: the domain name for which this record is valid, ending in a dot.

TTL: standard DNS time to live field, which sets an expiration period or limitation relating to the record.

class: standard DNS class field.

priority: the priority of a target host.

weight: A relative weight for records with the same priority.

port: the TCP or UDP port on which the service is to be found.

target: the canonical hostname of the machine providing the service.

For example, a domain owner of nchain may create an SRV (service) record with the following parameters:

| Parameter | Value |
|---|---|
| Service | _bsvalias |
| Proto | _tcp |
| Name | nchain |
| TTL | 3600 (for example) |
| Class | IN |
| Priority | 10 |
| Weight | 10 |
| Port | 443 |
| Target | payment-services.nchain.com |

Figure 2A:
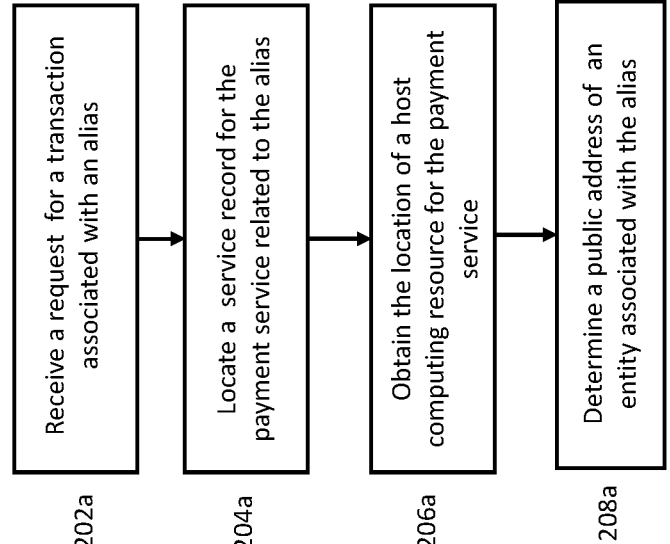
FIGS. 2a and 2b are flow diagrams depicting methods of identifying a host responsible for a payment service, implemented by one or more processors of a payment service and a payment client entity, respectively.
Figure 2B:
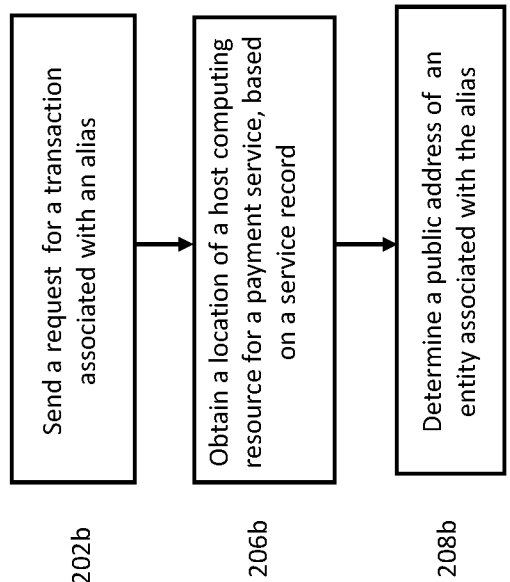

FIGS. 2a and 2b are flow diagrams depicting a method of identifying a host responsible for a payment service. FIG. 2a shows the method implemented by a one or more processors associated with the payment service, while FIG. 2b shows the method implemented by a one or more processors associated with the payment client entity.

In step 202a of FIG. 2a, the payment service receives a request from a requesting entity for a transaction associated with the alias. This request may be in the form of an input from an interface of a computing device of the requesting entity, i.e. the digital wallet that may be installed. For example, the request may include a request that indicates, payto alice@nchain.com from a payer entity.

In step 204a, responsive to the request or input in step 202 a search or lookup of the global directory, for example a DNS lookup is performed based on the alias input. This is to locate the service record for the payment service in the global directory that relates to the network identifier in the alias. Thus, using the same example as discussed above for FIG. 1, this step will identify the service record for the domain nchain as shown above, since nchain in the network identifier in the alias received. This service record for nchain will then identify that bsvalias is the payment service used for nchain.

In step 206a, once the service record, and hence the payment service, i.e. bsvalias has been identified, the location of the host computing resource for the payment service is obtained. In some embodiments this is returned to the requesting entity. In the example above, this location for the host corresponds to the target: port pair in the sry record for nchain. The target: port pair provides the location that a responsible host for the service bsvalias uses or operates from.

In step 208a, based on the location, i.e. target: port pair, of the host obtained in step 206a, a public address of the digital wallet associated with the alias may then be determined. In some embodiments, this may be based on a mapping upon signing up for the payment service or network, as for instance discussed in relation to FIG. 1. Once a public address is obtained, this can be used for bitcoin blockchain transactions between digital wallets.

FIG. 2b, as mentioned above relates to steps corresponding to FIG. 2a, but implemented on the payer or requesting entity's computing device or digital wallet.

Thus, step 202b relates to sending a request for a transaction from a requesting entity, the request associated with the alias.

Step 206b relates to obtaining the location of the host computing resource associated with the payment service, the location being based on a service record related to the network identifier. This for example is carried out in steps 204a and 206a of FIG. 2a. Thus, the location obtained here will be the target: port pair for the host for "bsvalias" payment service.

In step 208b, the public address of the digital wallet associated with the alias is then obtained, so that this may be used for the transaction associated with the digital ledger.

Figure 3A:
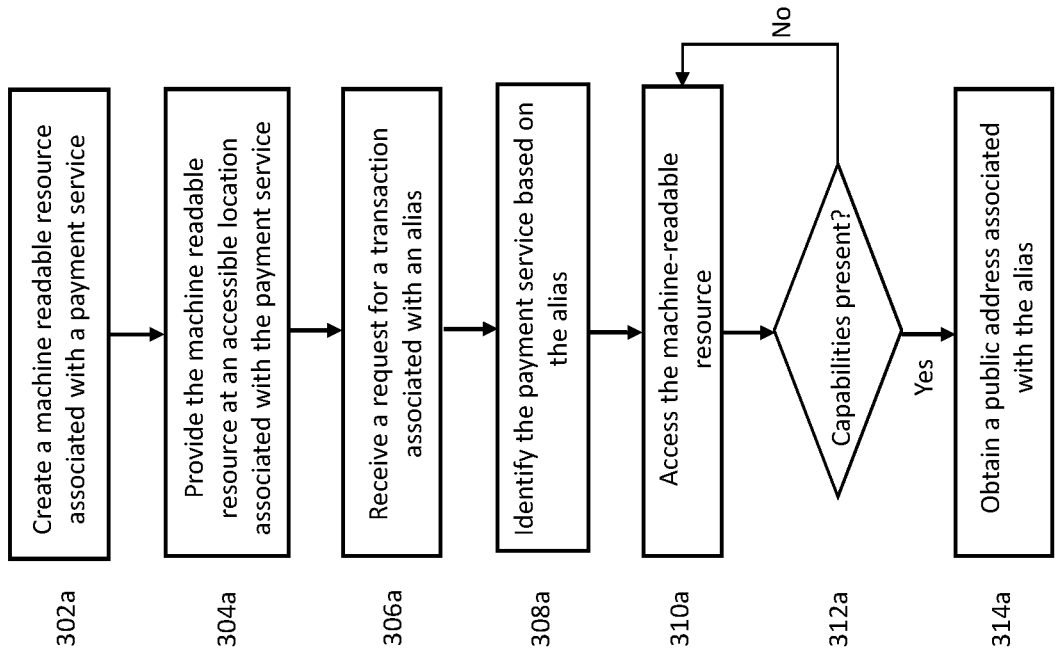
FIGS. 3a and 3b are flow diagrams depicting methods of identifying a public address associated with an alias according to a second aspect of the present disclosure, implemented by one or more processors of a payment service and a payment client entity, respectively.
Figure 3B:
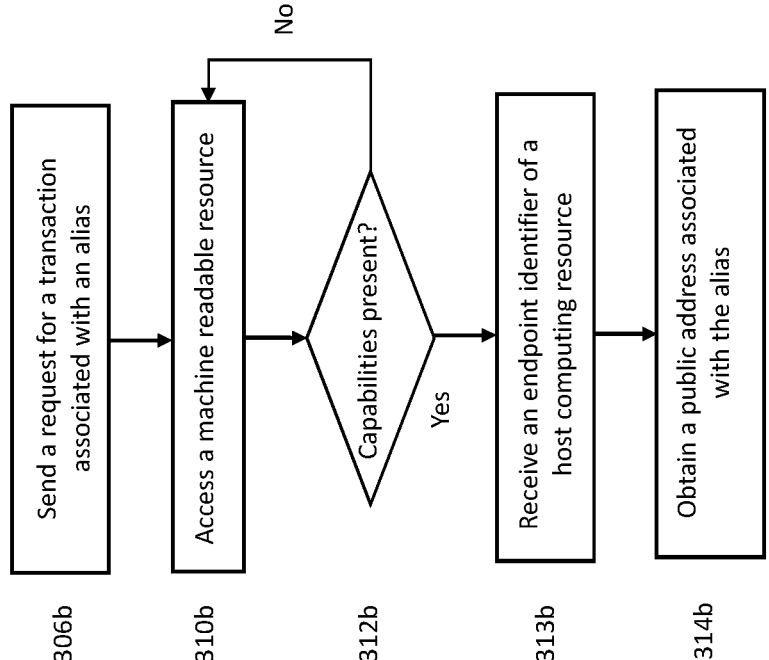

FIGS. 3a and 3b are flow diagrams depicting methods according to the second aspect of the disclosure, for identifying a public address associated with an alias in a request for a transaction. FIG. 3a shows the method implemented by a one or more processors associated with the payment service, while FIG. 3b shows the method implemented by a one or more processors associated with the payment client entity.

In step 302a of FIG. 3a, a machine readable resource is created for the payment service. The machine readable resource is provided for ensuring that functions or capabilities offered or supported by the payment service and/or any instructions to make use of these capabilities can be identified. Henceforth, this process is referred to as capability discovery relating to the payment service. Thus, the machine readable document is created for a capability discovery process by which a payment client entity or a digital wallet or application that may wish to use or request a service can learn or discover the supported features of the payment service, and any respective endpoints and configurations associated with using the payment service. In some embodiments, the machine readable resource is a file or a document that is previously generated and saved in associated with the payment service, i.e. is a static document. In some embodiments, for instance in an enterprise-grade service implementation, the machine readable resource may be dynamic and can generated this on demand rather the as a static file that is saved onto a web server, for instance. Advantageously, such dynamically generated resources provide a simplification in service deployment, migration, maintenance and any upgrade that may be required to be carried out. In some embodiments, JSON (JavaScript Object Notation) which is a lightweight data-interchange format, is used to generate the machine readable resource. JSON is a text format that is completely language independent, but uses conventions that are familiar to programmers of the C-family of languages, including C, C++, C#, Java, JavaScript, Perl, Python, and many others. These properties make JSON an ideal data-interchange language. Further JSON is built on two structures, a collection of name/value pairs and an ordered list of values. In most languages, this is realised as an array, vector, list, or sequence. As these are universal data structures, virtually all modern programming languages support them in one form or another. Thus, using JSON for the machine readable resource is preferable, as it is provides a data format that is interchangeable with other programming languages that may also be based on these same structures.

The machine readable resource may include the following information relating to the payment service.

at least one an endpoint identifier associated with a host computing resource responsible for implementing the payment service. This may be the location, i.e. a target: port pair, for a server or computing resource responsible for one or more functions of the payment service.

an entry associated with at least one capability among a plurality of capabilities supported by the payment service. This may be one or more functions, such requesting entity or payer entity validation, multiple digital signatures for transactions, payee entity or payment destination approval for transactions, and/or email based payment transactions so that transactions are sent to an email address associated with an alias before posting to a distributed ledger, payer and/or payee call-back function relating to requests or responses etc. that may be supported by the payment service.

instructions and/or a specification for accessing a public address (of an entity or digital wallet), that may be used for facilitating transactions with the entity or digital wallet associated with the alias. In some embodiments, accessing the public address includes accessing one or more resources or URI's associated with the payment service, based on the alias. In some embodiments, once obtained, the public addresses address may be used in an output script that is used in construction of a transaction for the distributed ledger. In some embodiments, accessing the public addresses may include resolving the public keys for the entities based on PKI procedures and/or resolving the payment destination, i.e. the payee digital wallet.

For instance, the machine readable resource may indicate the following file or entry for the payment service "bsvalias"

```
{
  "bsvalias": "version ..."
  "capabilities": {...
   "pki": "https://bsvalias.example.org/
   {name} @ {domain.tId}/id",
   "paymentDestination": https://bsvalias.example.org/
{name} @ {domain.tId}/payment-destination"
  }
}
```

The template values {name} and {domain.tld} refer to the components of the alias format <name>@<domain>.<tld>, where tld is a top level domain such as .com or .org or .co.uk etc. Requesting entities or payment clients may replace the templates with the alias. Thus, in the above example, this will be alice@nchain.com.

Step 304a relates to storing the machine readable resource at a predictable or known location associated with the payment service. For example, a payment service operator or processor for the payment service "bsvalias", following creation of a JSON formatted text document as described above in step 302a may provide the document at the following location:

https://<host-discovery-target>:<host-discovery-port>/
.well-known/bsvalias.

Providing the JSON formatted document at a well-known predictable location is useful so that it is publically accessible to all entities who are aware of the payment service (based on network identifier, for example). The above example location is based on the Internet Assigned Numbers Authority's (IANA's) Well-Known URIs resource. Thus, the machine-readable resource is placed in a predictable location on a web server for capability discovery relating to the payment service bsvalias.

In step 306a, a request for a transaction from a payment client entity is received, the request including an alias to which the payment is to be directed. Following on from the above discussed example, this includes a request such as payto:alice@nchain.com In step 308a, the payment service associated with the alias is identified. This is based on the network identifier, i.e.

nchain, in the alias. The payment service associated with this identifier, i.e. bsvalias, is identified in this step. Host discovery according to the first aspect to identify a service record may also be performed prior to this, although this is not essential for the embodiment shown in FIG. 3. For example, a mapping stored in a database or a text document based service discovery process may also be used to identify the host for bsvalias instead of the service record in the first aspect.

In step 310a, based on the identified payment service, the machine readable resource for the payment service is accessed from the predictable or known network location. For example, the JSON document for the service bsvalias is obtained from the well-known location as specified in step 304a.

Step 312a determines if one or more capabilities for the requested transaction are present in the machine readable resource. This step involves identifying if one or more entries relating to supported capabilities are suitable for the request. For example, this may include checking that a common capability is supported by the requesting client entity's payment service and the capabilities in the JSON document for bsvalias, i.e. the payment service for the payee alice@nchain.com. In some cases, no additional capabilities may be specified or required by the requesting entity, in which case the payment transaction can proceed whether there are common capabilities or not.

In step 314a, assuming that the machine readable resource has at least one supported capability for the transaction (if this is specified by the requesting entity), once this has been identified, an endpoint identifier associated with the host computing resource for the payment service is returned from the machine readable resource. In the above example, this may be a location for a responsible host for bsvalias. A public address can then be obtained for the digital wallet associated with the alias using one or more of the instructions and/or specification in the machine readable resource for the payment service "bsvalias".

FIG. 3b, as mentioned above relates to steps corresponding to FIG. 3a, but implemented on the payer or requesting entity's computing device or digital wallet.

Thus, step 306b relates to sending a request for a transaction from a requesting entity, the request associated with the alias, i.e. sending a payto: alice@nchain.com, following the above discussed example.

In step 310b, following identification of the payment service based on the network identifier in the alias, for example as set out in step 308a of FIG. 3a, this step includes accessing the machine readable resource by the requesting client from the well-known location associated with the identified payment service, for example as set out in step 304a of FIG. 3a.

Step 312b relates to the requesting entity determining if one or more capabilities for the requested transaction are present in the machine readable resource. This step involves checking the JSON document to identify if one or more entries relating to a common or specified supported capability will be suitable or needed for the requested transaction, similar to step 312*a* of FIG. 3*a*.

In step 313*b*, based on identifying if one or more capabilities are present in the machine readable resource, the requesting client receives an endpoint identifier associated with the host computing resource for the payment service, i.e. the host location for the service bsvalias.

In step 314*b*, the requesting client then obtains a public address associated with the alias. This can be obtained by the requesting client performing functions in accordance with one or more of the instructions and/or specification in the machine readable resource.

FIG. 4 depicts an example sequence of instructions specified in the machine readable resource of the second aspect for implementing a public key infrastructure (PKI) technique for obtaining cryptographic keys associated with the alias.

In step 402, a PKI request template from the machine readable resource must be obtained from the machine readable resource associated with the payment service. This template is in some embodiments a temple to request a PKI endpoint identifier, which is a URI for a computing resource for the payment service that is configured for identifying and/or validating public keys of payment client entities. For instance, following on from the example above, the template may be:

"pki":                    "https://bsvalias.example.org/{name}@{domain.tld}/id

In step 404, once the template has been received, the alias and the associated network identifier is included or substituted in the appropriate fields of the template, to generate a completed PKI request. For example, the template values {name} and {domain.tld} refer to the components of alias, i.e. <name>@<domain>.<tld> and must be substituted before issuing a complete request based on the machine readable resource. The result of this step is the provision of a PKI endpoint identifier for "bsvalias".

In step 406, a HTTP GET request is made based on the PKI endpoint identifier obtained in step 404.

In step 408, a public key associated with the alias can then be obtained in response to the request made in step 406. In most cases, the public key is a stable elliptic curve digital signature algorithm (ECDSA) public key that has not been used as part of any on-chain transaction. If a request for a valid alias, i.e. one that is associated with a payment service and has been assigned a public key, has been received, then a return message from a host responsible for the payment service's PKI may be in the following format to return the public key.

```
{
"bsvalias": "1.0",
"alias": "<name>@<domain>.<tId>",
"pubkey": "..."
}
```

The ECDSA public key will be a valid point on the secp256k1 curve, compressed, and hex-encoded. This means that the "pubkey" string length is 66 bytes long (33 bytes binary, each byte encoded as two hex characters):

| Start | Length | Value |
|-------|--------|-------|
| 00 | 02 | "Odd/even" indicator, either "02" or "03" |
| 02 | 64 | Elliptic curve point x-coordinate |

If the request is based on an alias that is not valid, i.e. one that is not associated with the payment service and/or a public key, then the return message will indicate that an error has occur or that the requested resource is not found or is unavailable or unauthorised.

Figure 5A:
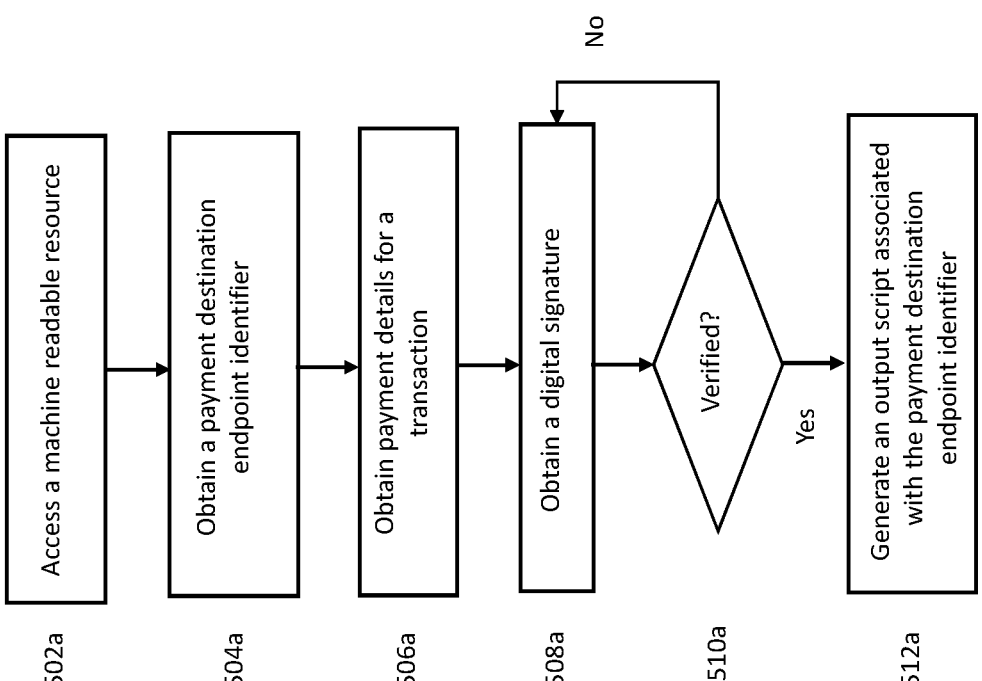
FIGS. 5a and 5b are flow diagrams depicting methods for destination addressing according to a third aspect of the present disclosure, implemented by one or more processors of payment service and a payment client entity, respectively.
Figure 5B:
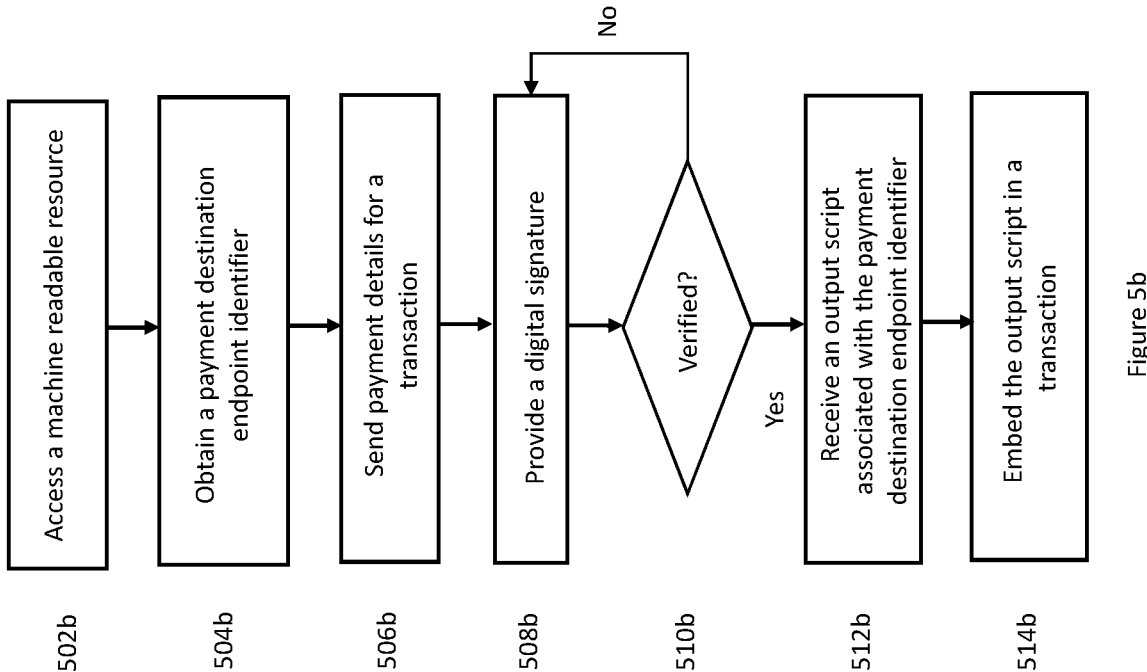

FIGS. 5*a* and 5*b* are flow diagrams depicting methods according to the third aspect of the disclosure, for identifying a payment destination associated with an alias in a request for a transaction. The payment destination is used in constructing a transaction for a distributed ledger. FIG. 5*a* shows the method implemented by a one or more processors associated with the payment service, while FIG. 5*b* shows the method implemented by a one or more processors associated with the payment client entity. In some embodiments, obtaining the payment destination is based on, or is part of obtaining the public address associated with the alias in FIGS. 3*a* and 3*b*. In some embodiments, the payment destination endpoint identifier relates to an address that is to be encoded or included in an output script, so that a transaction may be constructed for the blockchain based on this address. In some embodiments, the payment destination endpoint identifier is the same as the public address referred above. In other embodiments, the payment destination endpoint identifier may be different to the public address associated with the alias, or may be part of or associated with the public address for the digital wallet. In some embodiments, the public address and/or the payment destination endpoint identifier associated with the alias may static or dynamically assigned.

Step 502*a* of FIG. 5*a* relates to accessing the machine readable resource for the payment service, following identifying the payment service in the alias. The identity of the payment service as well as the location of the machine readable resource can be obtained as described above in relation to FIGS. 1, 3*a* and/or 3*b*.

In step 504*a*, a payment destination endpoint identifier is obtained from the machine readable resource, using the one or more instructions and/or specification in the machine readable document. This endpoint may be a URI for a computing resource or server for the payment service that is configured for resolving the payment destination endpoint for the digital wallet associated with the alias.

In step 506*a*, payment details for a payment transaction is obtained from a payer entity. For example this may include at least the alias associated with the payee entity's digital wallet, and an amount of cryptocurrency to be paid to the payee. This may be provided using an interface associated with the payer entity's computing resource or application.

In step 508*a* a digital signature for the request with the payment details in step 506*a* and a cryptographic key associated with the payer entity is obtained. This signature related to the request pertaining to a transaction is in most cases applied using the private key of the requesting, i.e. payer entity.

In step 510*a* the digital signature may be verified, so that the identity of the payer entity can be authenticated. This may be performed using one or more known techniques. In some embodiments, assuming that ECDSA keys are used, the public key of the payer entity, for instance obtained using the PKI sequence in FIG. 4, can be used to verify the identity of the signing entity (the payer entity). If verification fails, a digital signature may need to be provided once again, or one or more error messages could be generated.

In step 512*a*, following a successful verification outcome in step 510*a*, an output script based on the payment destination endpoint identifier associated with the alias is generated. This output script is provided for embedding in a payment transaction for the distributed ledger, in order to automatically resolve the payment destination in a transaction for the distributed ledger.

For example, the output script returned for construction of transactions for the distributed ledger, i.e. a Bitcoin blockchain, may conform to the following schema:

```
{
  "output": "..."
}
```

The value of the output field may be a hex-encoded Bitcoin script, which the payer entity will use during the construction of a payment transaction.

Various possible types of output script may be generated, but for ease of explanation, a Pay to Public Key Hash (P2PKH) output script generation is discussed in the following example.

Given a key pair with the public key of 027c1404c3ecb034053e6dd90bc68f7933284559c7d07633 67584195a8796d9b0e, a P2PKH output script for the same may be hex-encoded as:

76a9140806efc8bedc8afb37bf484f352e6f79bff1458c88
ac

This can be broken down as follows:

76; OP_DUP
a9; OP_HASH160
14; Push the next 20 bytes on to the stack
08 06 of c8; ripemd160 (sha256 (compressed_public_key))
be dc 8a fb
37 bf 48 4f
35 2e 6f 79
bf f1 45 8c
88; OP_EQUALVERIFY
ac; OP_CHECKSIG The service response body, i.e. the script for embedding in the transaction in step 512a would then be:

```
{
  "output":
  "76a9140806efc8bedc8afb37bf484f352e6f79bff1458c88ac"
}
```

FIG. 5b, as mentioned above relates to steps corresponding to FIG. 5a, but implemented on the payer or requesting entity's computing device or digital wallet.

In step 502b, based on a request for a transaction from a payer entity where the request associated with the alias, the machine readable resource is accessed by the payer entity from a location associated with the payment service.

In step 504b, a payment destination endpoint identifier based on the one or more instructions and/or specification in the machine readable document is obtained by the payee entity.

Step 506b relates to sending or providing payment details for the transaction, the payment details including an alias associated with a payee entity's digital wallet and an amount of cryptocurrency to be paid to the payee.

Steps 508b and 510b relate to the payer entity providing a digital signature for associating the payment details with a cryptographic key, followed by verification as discussed in the corresponding steps in FIG. 5a.

Step 512b relates to receiving an output script by the payer entity based on the payment destination endpoint identifier associated with the alias. This is explained in related to FIG. 5a above.

Step 514b relates to constructing a payment transaction for the distributed ledger by the payer entity, by embedding the received output script in the transaction.

FIG. 6 depicts an example sequence of instructions specified in the machine readable resource for implementing a payment destination endpoint resolution sequence associated with the alias for the digital wallet.

In step 602, a payment destination request template from the machine readable resource is obtained from the machine readable resource associated with the payment service. In some embodiments, this is a template to request the payment destination endpoint identifier discussed in FIGS. 5a and 5b. For instance, following on from the examples discussed above for the payment service bsvalias, the template may be:

"paymentDestination": https://bsvalias.example.org/ {name}@{domain.tld}/payment-destination In step 604, once the template in step 602 has been received, the alias and the associated network identifier is included or substituted in the appropriate fields of the template, to generate a complete payment destination request. For example, the template values {name} and {domain.tld} refer to the components of target alias, i.e. <name>@<domain>.<tld> and must be substituted before issuing a complete request based on the machine readable resource. The result of this step is the provision of a payment destination endpoint identifier, which in some embodiments may be a URI for a computing resource that is responsible for identifying the payment address that is to be used for generation of an output transaction script associated with the alias.

In step 606, a HTTP POST request is made based on the payment destination endpoint identifier obtained in step 604.

In step 608, an output script related to the alias and based on the payment destination endpoint identifier is returned, which is in turn used in the construction of a payment transaction for the distributed ledger, as discussed in FIGS. 5a and 5b.

In some embodiments that are related to the above discussed third aspect, the body of a request for a payment destination according to the third aspect (such as the request associated with steps 502a, 502b or the POST request in FIG. 6 discussed above), may indicate a content type of application/json. This is because templates for making or completing the request is based on the machine readable resource for the payment service, i.e. bsvalias. In some embodiments, the request from a payer entity may conform to the following schema, in addition to identifying the alias of a payee entity in the request, as indicate above (see FIG. 6 for instance):

```
{
  "payerName": "FirstName LastName",
  "payerHandle ": "<alias>@<domain.tId>",
  "dt": "<ISO-8601 timestamp>",
  "amount of cryptocurrency": 550,
  "purpose": "message to payee",
  "signature": "<compact Bitcoin message signature>"
}
```

The fields of the above schema are briefly explained in the below table, with further explanation of some of the fields given below.

| Field | Description |
|---|---|
| payerName | Human-readable payer display name |
| payerHandle | Alias associated with the payer entity or payer's digital wallet |
| dt | A timestamp, which may be in a preferred or accepted format, such as an ISO-8601 formatted timestamp (see below) |
| amount | The amount of cryptocurrency, such as BSV (Satoshis) or Ethereum or other Bitcoin or IBM chains, etc. that the payer intends to transfer to the payee client entity |
| purpose | Human-readable description of the purpose of the payment, i.e. for subscription payment, to clear an outstanding balance, etc. |
| signature | This may be a compact Bitcoin message signature (see below) |

In some embodiments, in addition to including the alias of a payee entity, it may be enough if the field identified as payerHandle in the above schema is present, or associated with the request. In some embodiments, if the payer entity or digital wallet associated with the payer client does not have an alias for payment transactions, then this payerHandle may simply be associated with a public identifier or IP or Bitcoin address for the payer. Hereinafter, the payerHandle in this disclosure is described as being an alias associated with the payer client entity. Thus, in such embodiments, the payer entity has an alias, and is associated with a payment service for facilitating payment transactions based on the alias. The payer's payment service that may be the same as or different to the payment service of the payee.

In some embodiments, the timestamp field as noted by "dt" in the above table, as well as the payerHandle may be required in the schema for the request. In other embodiments, the timestamp, payerhandle as well as the signature filed may be requested for certain requests or in order to operate in accordance with one or more capabilities that may be present in the machine readable resource associated with the payee client.

The remaining fields may be optional as far as functioning or operation of the request is concerned. However, in many situations the amount is usually indicated (even if this is 0). The optional fields or non-zero values for the optional fields but may be present in the request if it is known or if the information is available to the payment entity, i.e. the payer entity in this case. The timestamp and signature fields, which may be considered mandatory for certain payment service capabilities that are specified in the machine readable resource, are explained below.

The timestamp field "dt" may contain an accepted standard ISO-8601 formatted current time at the point when the payer initiates a payment destination request. From JavaScript, this can be constructed using the command or instruction relating to the machine readable resource, such as JSON.stringify ( ). For instance, this may return the following:

let now=JSON.stringify ({'now': new Date ( )});

Which may yield for example:

```
{
  "now": "2013-10-21T13:28:06.419Z"
}
```

In some embodiments, the signature field may be based on a payment entity or client's ability to sign messages and verify message signatures. This functionality is, in most cases, essentially an implementation of standard ECDSA, however with an $(r, s)$ signature pair for integers $r$ and $s$, there is additional information provided to allow a client to verify a message signature against a P2PKH address (a hash of a public key) rather than directly against a public key.

In some embodiments, the signature may be the raw $(r, s)$ fields, computed over a double-SHA256 hash of the message, which in this case is the request discussed above. In order to leverage existing Bitcoin client libraries, such as MoneyButton's BSV library for example, or other similar cryptocurrency libraries, existing signing and verification protocols may be suitable for some embodiments.

In some embodiments, the MoneyButton BSV library's implementation is nominated as the standard message digest construction and signature encoding method for signatures included in payment destination requests. The message or request to be signed may begin with Bitcoin signature scheme's traditional or known preamble (as may be documented within a BSV library's source code), and is followed by the Unicode Transformation Format—8-bit (UTF8) string concatenation of the fields payerHandle and dt, and optionally the amount and purpose fields that are discussed in the above example schema.

Regarding the specification of the amount in the request, based on the above discussed schema, the following rules may apply for some embodiments:

If amount is present, it is converted to a string (with no leading zeros)

If amount is not present, the string "0" is used

If purpose is not present, an empty string " " is used (effectively purpose is not included in the message)

Figure 7:
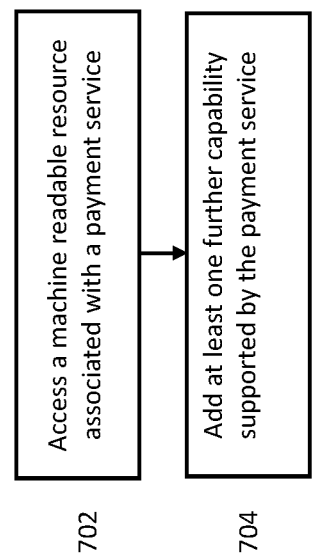
FIG. 7 is a flow diagram depicting methods of updating capabilities associated with a payment service.

FIG. 7 is a flow diagram depicting a method of updating capabilities for a payment service. This method can be applicable to one or more of the second to fifth aspects discussed above. This figure relates to a method implemented by a one or more processors associated with the payment service, as discussed above in related to the first implementation of the fourth aspect In step 702, a machine readable resource associated with the payment service, such as bsvalias, as discussed above in the examples for the earlier aspects, is accessed. Such access may be made a responsible host for the payment service. In some embodiments, access in order to make updates or changes may be restricted to the responsible host.

In some embodiments, the machine readable resources is one that is created and may be accessed from a well-known location associated with a payment service based on an alias for one or more payment clients of the payment service, as discussed above in relation to the second aspect. This is explained in detail in relation to FIGS. 3a and 3b.

In step 704, at least one further capability that is to be henceforth supported by the payment service (and accordingly such capability is to be provided to all payment clients associated with it) is added to the machine readable may be sufficient to signify that payer validation is enforced. In some embodiments where the value field is present, then any value other than true may be considered equivalent to false and indicates that payer validation is not in force.

Similarly, if another capability, such as asynchronous request processing is to be added, either separately or in addition to payer validation during the update in step 704, then the following entry is added to include a declaration of asynchronous processing support in the machine readable resource for bsvalias.

```
{
 "bsvalias": "1.0",
 "capabilities": {
  "name: asynchronous request processing"
  or "ref: da377cdc9ae7": {......
   "call-back": "https://bsvalias.example.org/ {name} @
{domain.tId}/payment-destination-response"
  }
 }
}
``` resource. Such addition may be implemented by the responsible host for the payment service. As discussed in respect of the second aspect, each capability or entry in the machine readable is either a set of one or more protocols or a specification or executable files or instructions that are to be followed, for implementing a respective capability for one of more clients associated with the payment service. The clients are the payment entities, such as the payer or payee entities or nodes involved in a transaction.

In some embodiments, the update in this step may simply be changing a value or field relating to enforcement of a capability. So, if payment service bsvalias already has a capability specification in the machine readable document, but the value is set to "false" or "0" as the capability is not as yet ready to be rolled out by bsvalias to its clients, or if there are ongoing changes or version updates to be finalised, then updating this to "true" or "1" is also considered an update for this step.

For example, to add a new capability so that payment service bsvalias supports payer validation henceforth, for all future cryptocurrency transactions for all clients or digital wallets associated with bsvalias, the machine readable resource (in the JSON format, as discussed above in the second aspect) for bsvalias may be updated to include the following entry or schema for the payer validation capability: enforcement:

The capabilities.da377cdc9ae7 path or object in the JSON document for asynchronous request processing does not include a value field. In this example, simply by adding the above specification, this capability is understood to be henceforth supported by bsvalias. The above also contains a call-back property with a template endpoint URI for incoming payment destination call-back requests. This will be discussed further in relation to the fifth aspect below.

Figure 8:
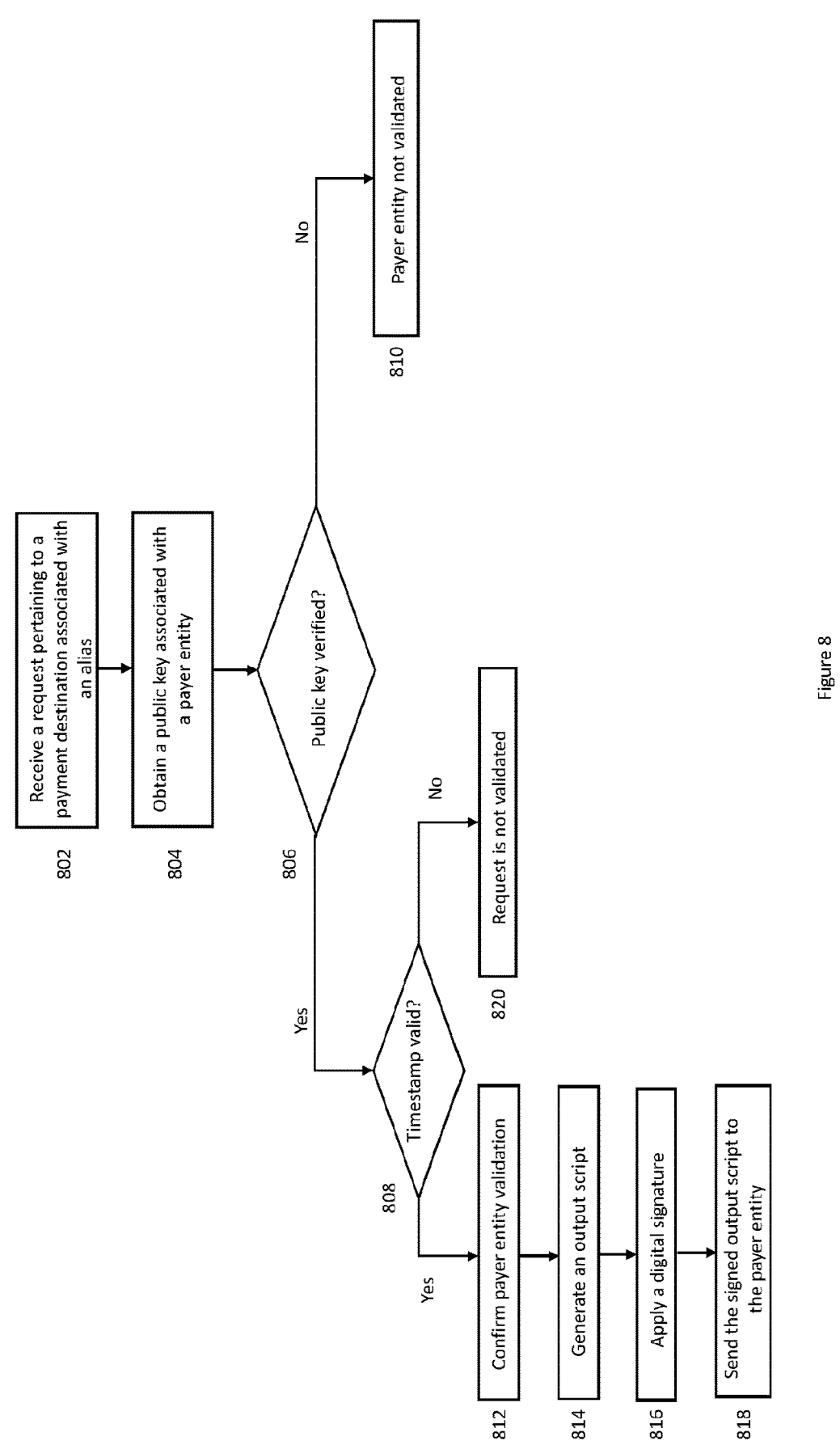
FIG. 8 is a flow diagram depicting methods of validating a payer entity according to a fourth aspect of the present disclosure, as implemented by one or more processors of a payment service.

FIG. 8 is a flow diagram according to the fourth aspect, depicting a method of implementing payer entity validation for a payment service, such as bsvalias. This method is implemented on the basis of one or more instructions or protocols or rules that are specified in a capability entry for payer validation, which is discussed above in FIG. 7, when this capability is enforced by the payment service for its clients. This method is related to one or more of the second and third aspects discussed above, and relates to a method implemented by one or more processors associated with the payment service, as is discussed above in related to the second implementation of the fourth aspect.

In step 802, a request is received, the request being from a payer entity and associated with an alias of a destination payment entity that is associated with the payment service.

For example, the request may include the alias "alice@nchain.com", where following on from the previous

```
{
 "bsvalias": "1.0",
 "capabilities": {
  "name: payervalidation "or "ref: c318d09ed403" {......}
  "value: true"
 }
}
```

The path capabilities.payervalidation or any other identifier, such as c318d09ed403 etc. is thereby included in the machine readable resource and in some embodiments set to the value "true" to identify that payer validation is in force. This capability will be discussed further in relation to the fourth aspect.

In some embodiments, the value field may not be present, in which case the inclusion of the above entry or schema examples, the payment service for the payment entity or digital wallet associated with such alias is bsvalias. Thus, henceforth the digital wallet for this alias is referred to the payee client (to identify that this payment entity is a client of bsvalias). The payer entity sending the request may or may not be associated with a payment service, in which case the payer entity will simply be identified by its public address for cryptocurrency transactions. If the payer entity is associated with a payment service that is the same as the payee client, then it can be referred using the alias "bob@nchain.com". It is also possible for the payer entity to be associated with a completely different alias based payment service, i.e. the payment service "notbsvalias" having a different machine readable resource that specifies its own capabilities entries. In this case the alias of the payer entity may be "bob@notnchain.com".

Henceforth, for ease of explanation for all implementations and embodiments for the fourth and fifth embodiments, the alias bob@nchain.com will be considered as an alias for the payer entity that is associated with the same payment service, i.e. bsvalias, as the payee client, and thus implements the same set of capabilities based on the same JSON document or machine readable resource. It will however be understood that the present disclosure is in no way limited to such implementation, as explained above.

In some embodiment this request may be based on a HTTP POST request associated with a payment destination request template for bsvalias, as explained in relation to FIG. 6.

In step 804, a public key associated with the payer entity is obtained by one or more processors associated with the bsvalias payment service. This may be obtained using the HTTP GET request based on the machine readable resource for bsvalias, as explained in relation FIG. 4.

In step 806, it is determined if one or more predefined conditions are satisfied for the payer validation capability enforced by bsvalias for alice@nchain.com. In the embodiment discussed in this figure, two conditions are assessed, the first one being public key verification for the payer entity. However, as discussed above, the predefined condition may be based on just of these conditions, or may include additional conditions (such as based on a one-time token). In the present embodiment discussed, the request should be digitally signed with a private key for bob@nchain.com, which can only be used with a public key linked to the private key for bob@nchain.com, i.e. part of the same cryptographic key pair, so that the request may be read, i.e. verified or obtained or decoded using the public key. Thus in this step it is checked if the digital signature in the request from bob@nchain.com is validated by the public key obtained in step 804.

If the request does not include any digital signature, or if the digital signature cannot be validated using the obtained public key in step 804, this means that the request includes a digital signature not associated with the payer entity. The request is then rejected as the identity of the payer entity is invalid or cannot be verified in step 810. In some embodiments, a response to signify that the request is rejected or unauthorised or not allowed may be generated for the payer entity. As discussed above, this increases security and reliability for transactions pertaining to the clients of the payment service, as the identity of the payer entity as well as the integrity as the contents of the request can be verified based on the above steps. The digital signature applied may, in some embodiments, be based on the compact Bitcoin message signature as discussed above in relation to an example schema for a request associated with a payment destination.

If the outcome of step 806 is that the digital signature in the request is validated based on public key obtained in step 804 for payer entity bob@nchain.com, then this confirms that the request ordinated from the payer entity bob@nchain.com. In step 808, it is then determined if the request meets the second of the two predefined conditions mentioned above for payer validation capability. The second condition in step 808 checks if the request includes a timestamp that is within a predefined duration of the time of receipt at the payment service. The time of receipt is based on the payment services' clock. This duration may be set out in the capability for payer validation. For example, this predefined duration may be 2 minutes to allow some time for any synchronisation and message transmission timing issues or delays. Other durations may also be possible, and this step is in no way limited to the duration of 2 minutes.

If the request does not include any timestamp, or if the timestamp is not within the predefined duration, then in step 820, the request from the payer entity is rejected or considered as invalid. As discussed above, this increases security and reliability by protecting clients of the payment system against message replay attacks or man in the middle attacks by verifying the timestamp. Thus, the request schema described above in relation to the third aspect includes at least the "dt" and "signature" fields if payer validation capability is enforced according to this embodiment. In other embodiments, the satisfaction or meeting of one of the above discussed conditions may suffice for payer validation, but in most cases both conditions are preferred to be met.

In step 812, if both the conditions are satisfied, i.e. if the digital signature relates to the obtained public key and if the timestamp is within the predefined duration, the payer entity is considered to be successfully validated, thereby signifying that the request for the payment destination can be processed In step 814, an output script associated with the payment destination of the alias of the payee client, i.e. alice@nchain.com, is then generated. This may be similar to the generation of the output script discussed in relation to FIG. 5*a*.

In step 816, a digital signature associated with the payee client is applied to the output script. Similar to the signature discussed above for the payer entity in step 806, here the private key of a cryptographic key pair for alice@nchain.com is used to sign the output script, such that the can be obtained using a public key of the same key pair. This is to ensure that the output script is not tampered with in transmission, and also to help the payer entity to confirm the origin of the output script.

Thus, the schema for the output script sent may be:

```
{
 "output": "...",
 "signature": "<compact Bitcoin message signature>"
}
```

In step 818 the signed output script is sent to the payer entity bob@nchain.com, where once decoded or obtained or validated, this output script can be embedded in a transaction for the distributed ledger.

Figure 9:
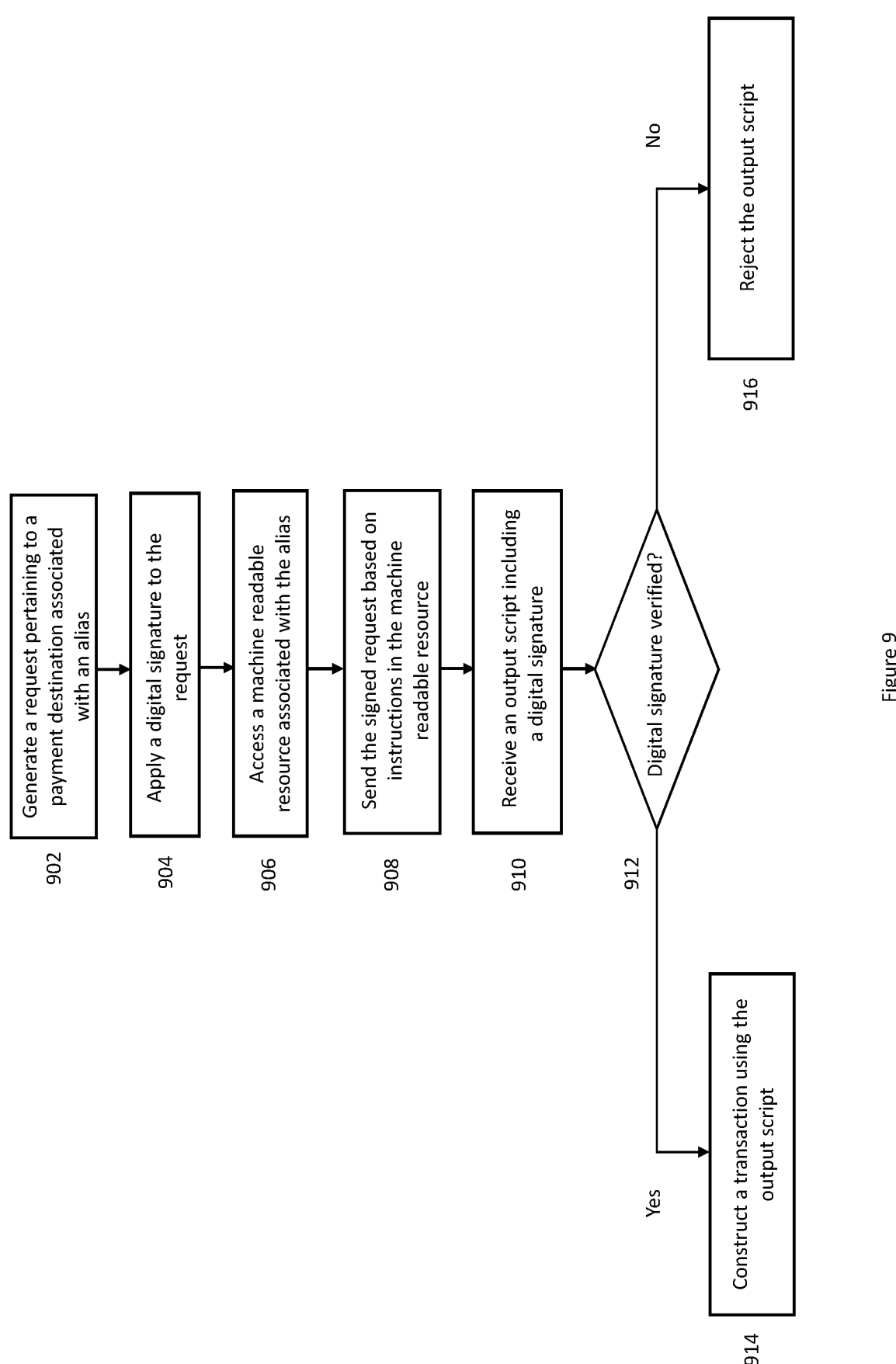
FIG. 9 is a flow diagram depicting a method of validating a payer entity according to a fourth aspect of the present disclosure, as implemented by one or more processors of a payer entity.

FIG. 9 is a flowchart depicting a method according to a third implementation of the fourth aspect relating to implementing the capability of payer validation for one or more payment entity clients associated with a payment service. In this case, the method depicted is performed by one or more processors associated with a payer entity, being the requesting entity. Thus, the method is related to the first implementation of the fourth aspect discussed in FIG. 8, but is concerned with the implementation by the payer entity, i.e. bob@nchain.com, following on from the same example.

In step 902, a request associated with an alias is generated, the request pertaining to a payment destination of a payee client, i.e. alice@nchain.com, among the one or more clients associated with the bsvalias payment service. Here the request includes the alias of the payee client.

In step 904, a digital signature associated with a public key of the payer entity bob@nchain.com is applied to the request. The process of applying the digital signature is similar as discussed above in relation to step 806 or 816 in FIG. 8 and/or in relation to the compact Bitcoin message signature set out in the third aspect above discussing the request schema, except that here the signature is applied using the payer entity's key, i.e. the private key for bob@nchain.com in the above example.

In step 906 the payer entity accesses a machine readable resource associated with the payment service of the alias. Thus in this step the JSON document or machine readable resource in relation to bsvalias is accessed based on the alias, alice@nchain.com. Methods relating to such access is discussed in relation to the second aspect.

In step 908, the signed request is then sent, based on one or more instructions and/or specifications in the machine readable resource pertaining to the payment destination. In some embodiments, the request is a HTTP POST request, and the instructions and/or specification is based on a payment destination request template, such as discussed in relation to FIG. 6 of the third aspect. The request, in some embodiments, includes a timestamp indicating the date and time of sending. This is in line with FIG. 8, which discusses that the signature and timestamp fields are required for implementing the capability of payer entity validation.

In step 910, an output script associated with the requested payment destination for alice@nchain.com is received by the payer entity. As discussed above, in relation to step 806 of FIG. 8, this output script includes a digital signature relating to the payee client, alice@nchain.com.

In step 912, it is checked if the digital signature correctly validates to or is related to the public key of the payee entity. For this the public key associated with the payee client alice@nchain.com must first be obtained. In some embodiments, this is based on the HTTP GET request using the bsvalias machine readable document, as discussed in relation the FIG. 4 of the second aspect. The digital signature is then verified based on this obtained public key.

In step 914, if the digital signature can be verified or validated or decoded using the obtained public key, then the output script is confirmed to originate from the payer entity without any tampering or malicious interception. In this case, the output script is embedded in a transaction for the distributed ledger, the transaction associated with the payer entity and the payee client.

On the other hand, if the digital signature does not relate to, or if the output script cannot be obtained using the obtained public key, then in step 916, the output script is rejected and no transaction is constructed, as neither the identity of the sender, i.e. here it is the payee client alice@nchain.com, nor the integrity of the contents of the script can be confirmed.

Figure 10:
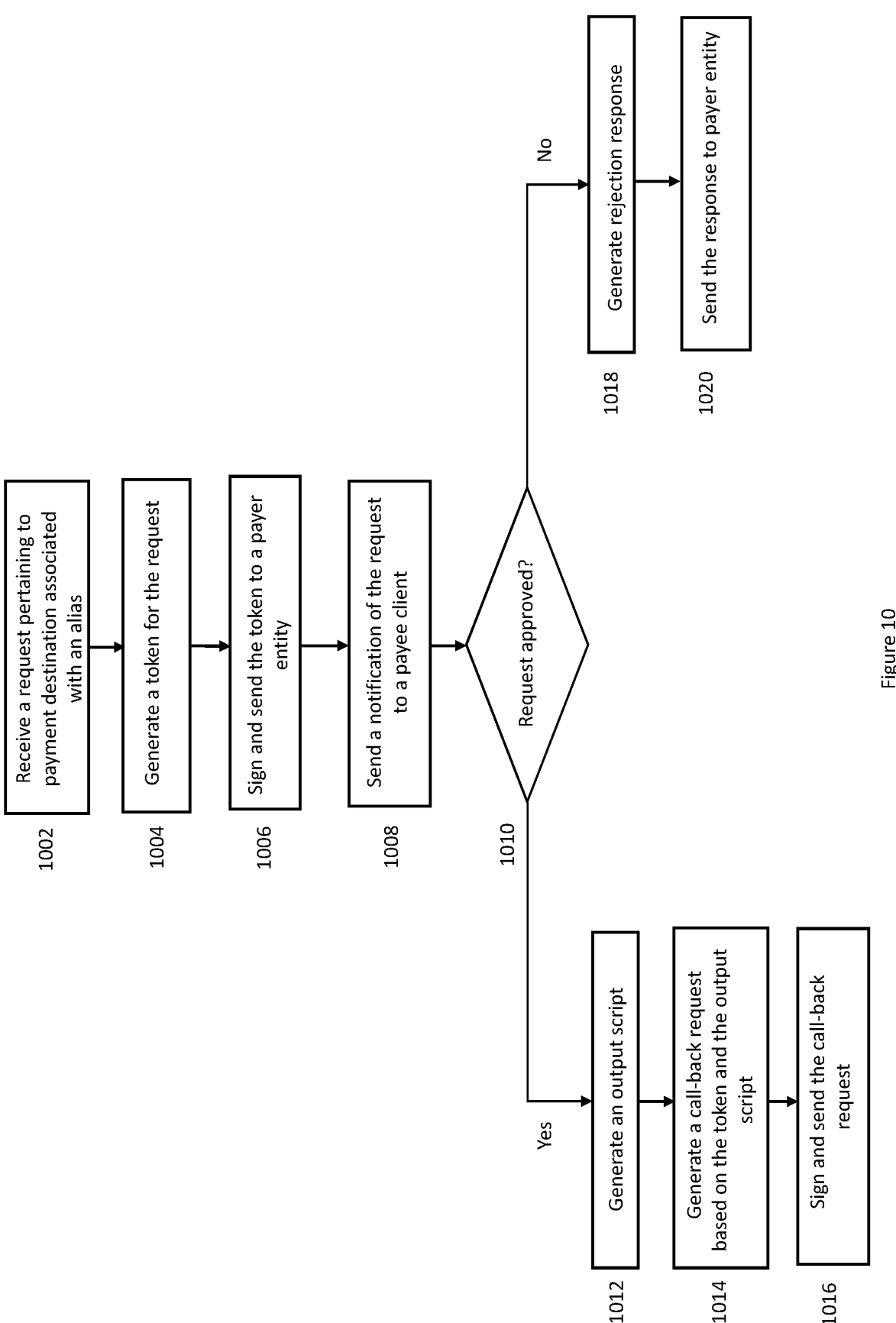
FIG. 10 is a flow diagram depicting a method of asynchronous request processing according to a fifth aspect of the present disclosure, as implemented by one or more processors of a payment service.

FIG. 10 is a flow diagram depicting a method of implementing asynchronous request processing (or delayed or discontinuous processing) for a payment service, such as bsvalias. This method is implemented on the basis of one or more instructions or protocols or rules that are specified in a capability entry for asynchronous request processing, which is discussed above in FIG. 7, when this capability is enforced by the payment service for its clients. This method is related to one or more of the second, third or fourth aspects discussed above. This figure relates to a method implemented by one or more processors associated with the payment service, as discussed above in relation to the first implementation of the fifth aspect.

In step 1002, a request associated with an alias from a payer entity is received, the request pertaining to a payment destination of a payee client associated with a payment service. Following on from the earlier example, it is understood that the request from payer entity bob@nchain.com includes the alias alice@nchain.com (the payee client), where alice@nchain.com is associated with payment service bsvalias. In some embodiments, the request is a HTTP POST request, as explained in relation to FIG. 6 of the third aspect that uses the payment destination request template based on a machine readable resource for bsvalias.

In step 1004, a token is generated, that is specific to the received request. In some embodiments, the token is a unique identifier, such as one based on a random number generator, where no two requests are ever assigned the same token. The token may be based on a specific seed or function related to the request. In some embodiments, this token may be a hash value of one or more components of the request itself.

In step 1006, this token is sent to the payer entity, just and is like an acknowledgement of receipt. In this embodiment, a token is understood to be generated for all requests received for payment clients such as alice@nchain.com, where the payment service bsvalias enforces the asynchronous request processing capability. In other embodiments, it may be that such token is only generated is a payee client is unresponsive for a predefined time period, i.e. 5 or 10 minutes after it receives a notification of a request. In some embodiments, as discussed in related to the fourth aspect, a digital signature may be applied based of a public key for the payee entity, i.e., alice@nchain.com, to ensure the security and integrity of the origin as well as the token. The schema for the content sent to the payer entity including the token may be:

```
{
   "token": "...",
   "signature": "..."
}
```

In step 1008, a notification regarding the received request is sent to the payee client, alice@nchain.com. This may be sent even when the payee client is not connected to the Internet or is offline or switched off or non-operational or unresponsive at the time of sending the notification.

In step 1010, it is determined if alice@nchain.com has either approved or rejected the notification using a user interface or an indicator on a communication terminal, and according sent a response indicating this to bsvalias. This response from the payee entity may arrive immediately or after some time from sending the notification, for instance after up to 2 days is also possible in this embodiment, but the disclosure is not so limited to this, as the period of inactivity may even be longer.

If a rejection of the request is received as a response from the payee client, then in step 1018 a rejection notice or record is generated for the request. In some embodiments, the outcome, i.e. the rejection notice is sent to the payer client in step 1120. The notice may not be sent in some other situations, where it may be sufficient if this rejection is simply recorded in relation to the request.

In step 1012, if an approval of the request is received, then an output script associated with the payment destination of the payee client alice@nchain.com is generated. The step of generating the output script may be similar to that explained in relation to FIG. 5a of the third aspect.

In step 1014, a call-back request including the token and the generated output script is generated. This is referred to a call-back request, because of the presence of the unique token which can be used to correlate the output script with the correct request, no matter the extent or time of the number of other messages or requests that has passed in related to bob@nchain.com or alice@nchain.com. In some embodiments, this call back request may be signed, i.e. by application of a digital signature that can be verified based on a public key for alice@nchain.com. In some embodiments, the call-back request may be based on a HTTP POST request as discussed in FIG. 6 of the third aspect, but with additional provisions for the token in the template associated with the asynchronous request processing capability discussed in relation to FIG. 7. This may be obtained from the machine readable resource for bsvalias, the payment service for alice@nchain.com and bob@nchain.com, although the payer entity may have a different payment service. For example, the capability entry for asynchronous processing may be:

```
{
 "bsvalias": "1.0",
 "capabilities": {
  "da377cdc9ae7": {
   "call-back": "https://bsvalias.example.org/ {name} @
{domain.tId}/payment-destination-response"
  }
 }
}
```

Thus, here the identifier for this capability may be the reference to the capabilities.da377cdc9ae7 object. This includes a call-back property with a template endpoint URI for payment destination request call-backs. Thus the call-back request is based on this, and in some embodiments the payment destination request template in FIG. 6.

In step 1016, the call-back request is provided to the payer entity along with the token and the output script. The token is used for correlating the output script with the request, and further to this correlation, the output script can be embedded in a transaction for the distributed ledger. The schema for the call-back request provide may be:

```
{
 "token": "...",
 "output": "...",
 "signature": "..."
}
```

The token here is the same token sent in step 1006

Figure 11:
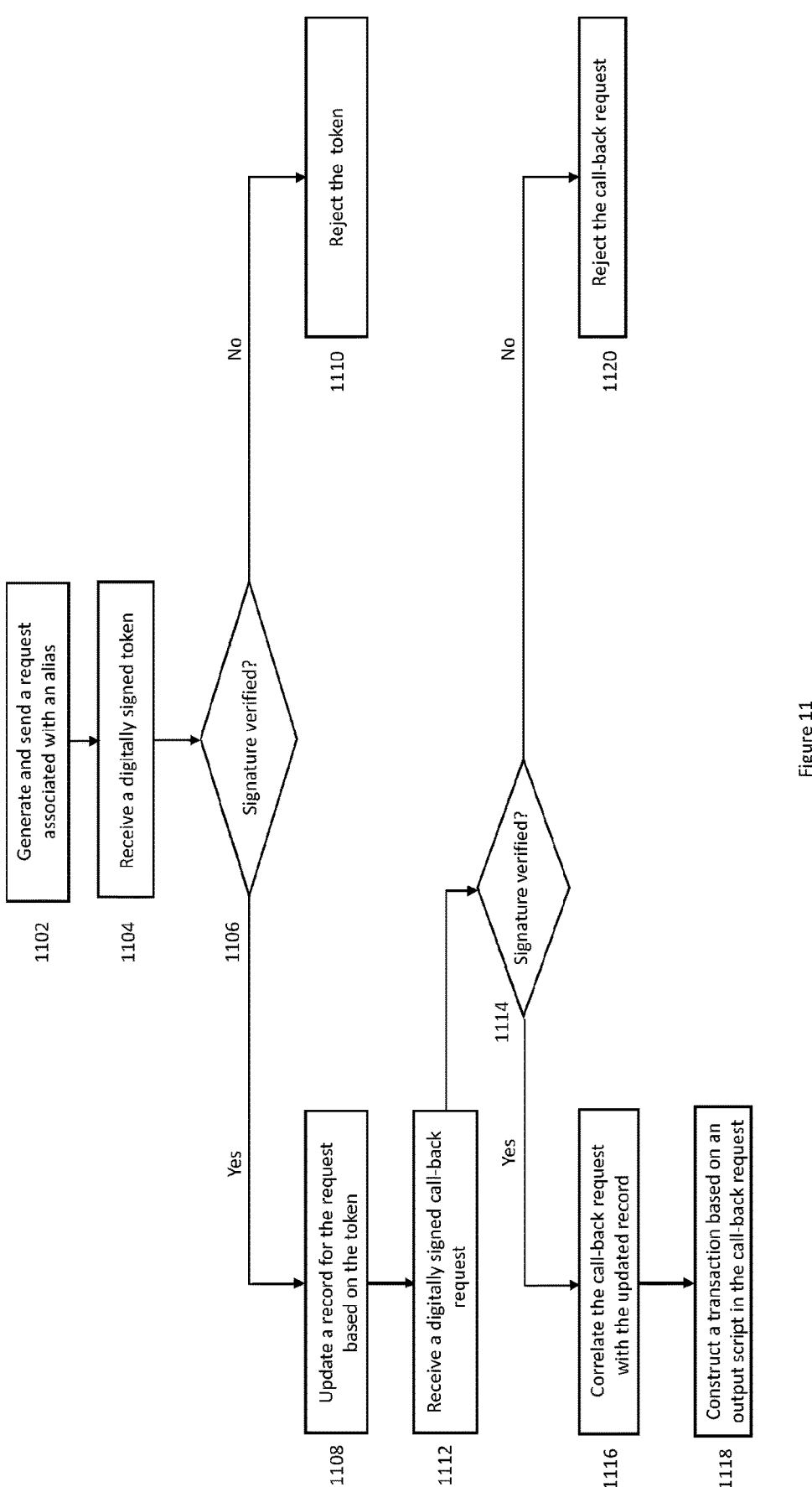
FIG. 11 is a flow diagram depicting a method of asynchronous request processing according to a fifth aspect of the present disclosure, as implemented by one or more processors of a payer entity.

FIG. 11 is a flowchart depicting a method according to a second implementation of the fifth aspect relating to implementing the capability of asynchronous request processing for one or more payment entity clients associated with a payment service. In this case, the method depicted is performed by one or more processors associated with a payer entity, that the requesting entity. Thus the method is related to the first implementation of the fifth aspect discussed in FIG. 10, but is concerned with the implementation by the payer entity, i.e. bob@nchain.com, following on from the same example. In some embodiments, the method as discussed in relation to FIG. 9 for implementing the capability of payer entity validation may also be included.

In step 1102, a request associated with an alias is generated, the request is pertaining to a payment destination of a payee client, i.e. alice@nchain.com, among the one or more clients associated with the payment service, bsvalias. Here the request includes the alias of the payee client. In some embodiments, this request may be digitally signed to include a signature such as discussed above in the request schema, especially if the capability of payer validation of the fourth aspect is also implemented. Once generated this request is sent to the bsvalias payment service for the payee client, alice@nchain.com by the payer entity, bob@nchain.com. The request may be sent using the HTTP POST request as discussed in relation to FIG. 6 of the third aspect.

In step 1104 a token is received by one or more processors of a digital wallet or device for the payer entity bob@nchain.com from the payment service, bsvalias. This token may be in some embodiments the same as, or related to the token generated in steps 1004 and 1006 of FIG. 10. Thus, the token is specific to the request, and associated with a digital signature that can be verified based on a public key for alice@nchain.com.

In step 1106, it is determined or verified if the digital signature associated with the token relates to the public key for the payee client, alice@nchain.com. In some embodiments, such verification includes obtaining the public key, for instance based on a HTTP GET request using the PKI template in the machine readable resource for bsvalias, and verifying that the key obtained is related to the digital signature (usually applied using a private key of the same key pair) can be used to obtain or decipher or decrypt the digital signature to obtain the token.

If the digital signature cannot be validated using the obtained public key for alice@nchain.com, then the token is rejected in step 1110 and the request is not processed.

If the digital signature can be successfully verified, then in step 1108, a record or database associated the payer entity bob@nchain.com is updated so that the token is linked to the respective request. This is so that this request can be correctly and swiftly identified when any further messages or requests associated with this token is received at a later time, in an asynchronous manner. Such record may be locally stored within one or more memory modules associated with the payer entity, or may be stored remotely at a server or in association with the payment service for the payer entity. Thus, the record may be located or stored anywhere pre and post update, as long as it is associated with payer entity, bob@nchain.com.

In step 1112, a call-back request is received from the bsvalias payment service of the payee client, alice@nchain.com. This call-back request is provided after the payee client approves the request, and therefore arrives out of sync or order as and when such approval has been received by bsvalias. The call-back request includes the same token as in step 1104, and also includes an output script in response to the request, this output script being associated with the requested payment destination for alice@nchain.com. The call-back request may be similar to the call-back request generated in step 1014 of FIG. 10, and is also associated with a digital signature. This, the call-back request may be a HTTP POST request based on a template in the machine readable resource for bsvalias, the payment service for bob@nchain.com, the payer entity.

In step 1114, the digital signature in the call-back request is verified. Such verification may be similar to the process discussed in step 1106. Once verified, the output script and token that can be obtained.

If verification based on a public key for alice@nchain.com fails, then the call-back request is rejected, and no output script is generated in step 1120.

If the verification in step 1114 is successful, then the token and output script is obtained by the payer entity. In step 1116, the token in the call-back request is correlated with the respective request in the updated record discussed in step 1108. Thus, this enables the correct request to be matched with the output script using the token.

Once the request has been identified in the updated record based on the token, the output script can be used in step 1118 to construct a transaction by the payer entity for the distributed ledger, the transaction associated with the payer entity and payee client.

Figure 12:
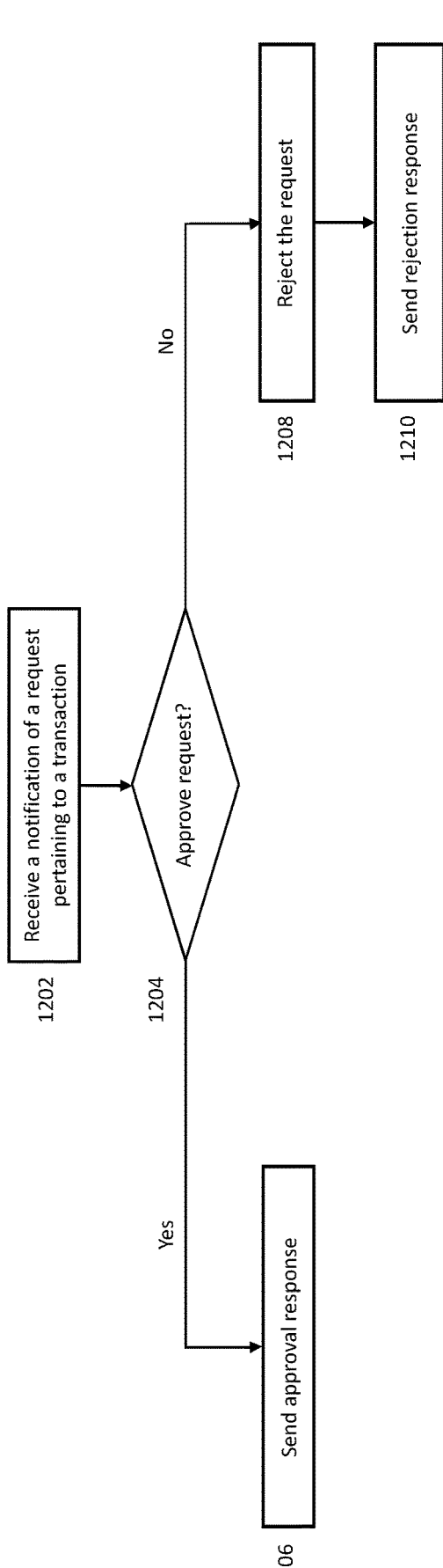
FIG. 12 is a flow diagram depicting a method of asynchronous request processing according to a fifth aspect of the present disclosure as implemented by one or more processors of a payee client.

FIG. 12 is a flowchart depicting a method according to a third implementation of the fifth aspect relating to implementing the capability of asynchronous request processing for one or more payment entity clients associated with a payment service. In this case, the method depicted is performed by one or more processors associated with a payer client being the destination entity. Thus the method is related response is one of rejection, then either such rejection response is sent to bsvalias, or instead the payee simply remains unresponsive until the expiry of a predefined period, for example 2 days, after which the payment service simply records that the notification is unanswered or unauthorised. In some embodiment, this then prompts the rejection in steps 1018 and 1020 of FIG. 10.

Figure 13:
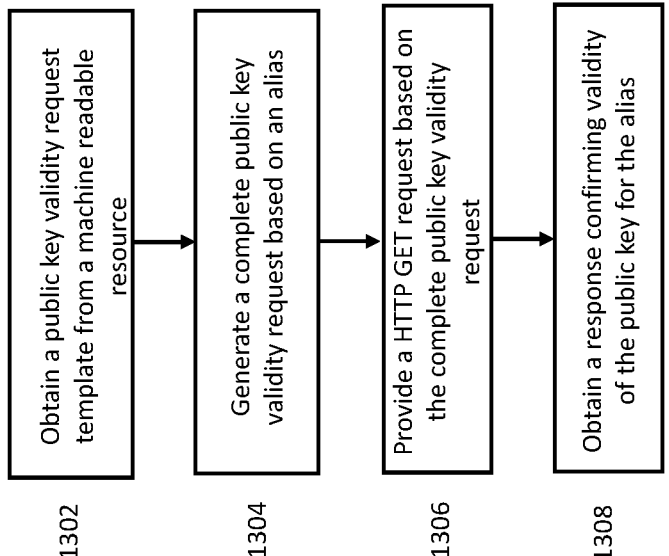
FIG. 13 is a flow diagram depicting a process for verifying a public key that is associated with a client of a payment service.

FIG. 13 depicts an example sequence of instructions specified in a machine readable resource associated with a payment service, such as bsvalias as described above, for implementing a public key verification. This is otherwise referred to a public key owner validation technique for cryptographic keys that are associated with the alias. This is based on a capability for checking that a key in a request is indeed related to the alias or payment entity or digital wallet that is associated with the alias. In most cases, the key to be checked is a public key of an asymmetric key pair that also includes a private key, to validate the owner of a public key. This public key may have been already known or previously obtained or cached by the payment entity or client that sends the request. The embodiments discussed in relation to FIG. 13 may be included in or related to any of the above second to fifth aspects of the present disclosure.

In step 1302, a public key validity request template is obtained from the machine readable resource associated with the payment service. This template is to request a key validity or verification endpoint identifier, which is a URI for a computing resource for the payment service that is configured for identifying and/or validating keys of a payment client entity. For instance, following on from the example above, the template may be based on the following capability or instructions in the machine readable document for bsvalias relating to a public key owner validation endpoint:

```
{
 "bsvalias": "1.0",
 "capabilities": {
  "ref: a9f510c16bde": "https://example.bsvalias.tId/api/
  {name} @ {domain.tId}/ {pubkey}"
 }
}
``` to the first implementation of the fifth aspect discussed in FIG. 10, but is concerned with the implementation by the payee client, i.e. alice@nchain.com, following on from the same example.

In step 1202 a notification in relation to a request associated with an alias of the payee entity is received. As with the above embodiments, the request that relates to the received notification pertains to a payment destination of the payee client, alice@nchain.com. This notification is sent by the payment service, bsvalias, of the payee client. If the payee client is offline or unavailable or switched off, this notification is provided on an interface associated with a digital wallet for alice@nchain.com, when online or operational again.

In step 1204, the payee client interacts with the notification to either approve or reject it. Such interaction may be by clicking on a button or a displayed object on the user interface, or by sending a message in response to the notification, or using a certain combination of keys on an input interface associated with the user interface for the payee client to signify whether the response is one of approval or rejection.

In step 1206, if the response is one of approval, this is sent by the payment service bsvalias. In step 1208, if instead the In this example, the reference to capabilities.a9f510c16bde is a template URL to verify the ownership of the "public key". The public key may have already been obtained by using the method as discussed in FIG. 4.

In step 1304, once the template in step 1302 has been received, the alias for the destination entity, i.e. this can be the payee client or the payer entity, is to be included or substituted in the appropriate fields of the template to generate a completed public key validity request. This may also be referred to as a key verification request. For example, the template values {name} and {domain.tld} refer to the components of alias, i.e. <name>@<domain>.<tld>, and must be substituted before issuing a complete request based on the machine readable resource, i.e. the alias for a payee client alice@nchain.com. The result of this step is the provision of a public key validity endpoint identifier for alice@nchain.com's payment service, i.e. bsvalias.

In step 1306, a HTTP GET request is made based on the endpoint identifier obtained in step 1304.

In step 1308, a response associated with the alias in the request is then obtained in response to the GET request made in step 1306. In most cases, this may simply indication of the public key matches or is validated for the alias indicated in the request. In some embodiments, the process of verification may be done by a key management server that is associated with managing all cryptographic keys and key pairs for the payment service bsvalias. For instance, the key management server may maintain an up to date record or a look up table that includes details of all current and valid public keys for each client of the bsvalias payment service. As discussed above, and in relation to FIG. 4, the public key may be an elliptic curve digital signature algorithm (ECDSA) public key.

If the key in the request is valid for the alias in the request, i.e. the owner of the key is indeed the payment entity associated with the alias in the request, then a response from a host responsible for the payment service's public key verification may be in the following format.

```
{
  "alias": <name@domain.tId> in the received request,
  "pubkey": <pubkey> in the received request,
  "match": true
}
```

If the "pubkey" in the request is not valid for the alias in the request, i.e. one that is not associated with the alias, or is at least no longer valid for that alias even if it may have been valid in the past, then the "match" field in a return message may indicate the value "false". In some embodiments, the response in this case may simply mention that an error has occurred or that the requested resource is not found or is unavailable or unauthorised.

Figure 14:
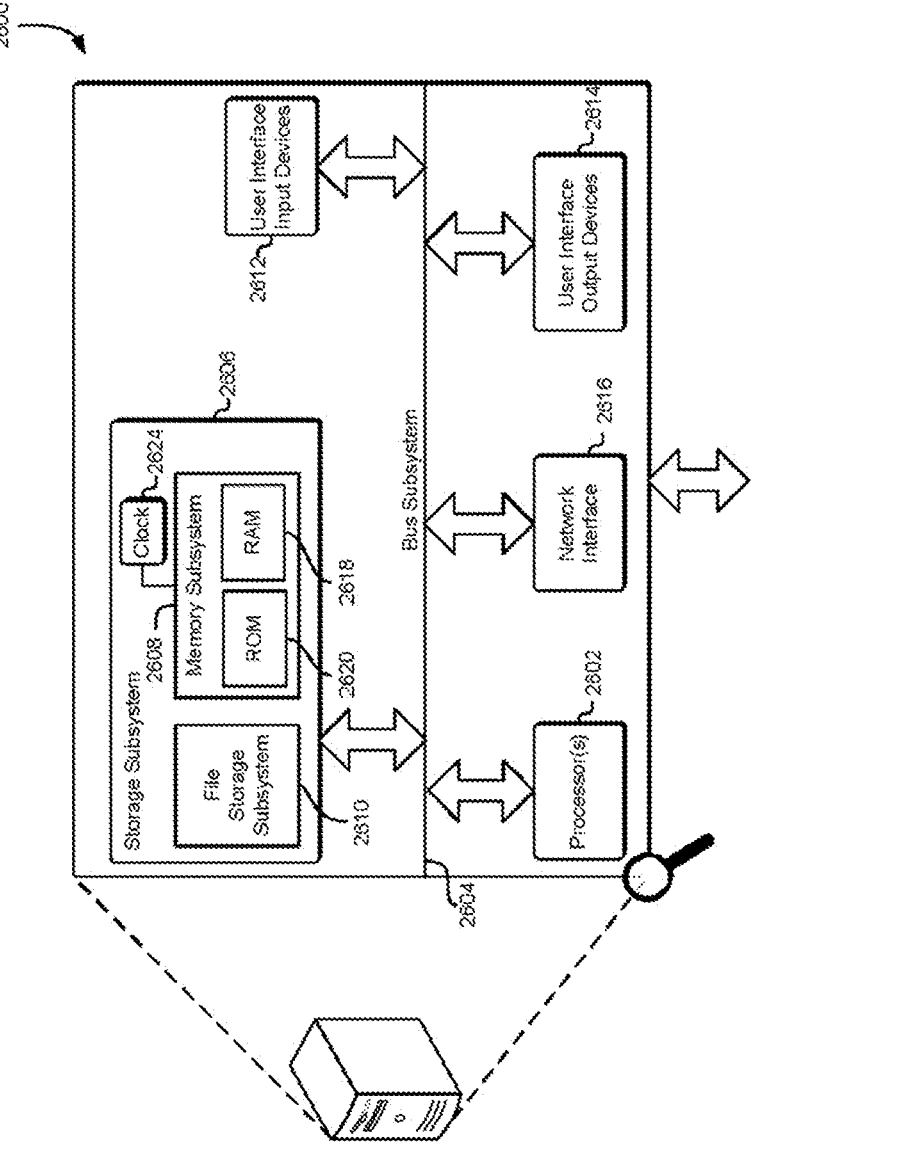
FIG. 14 is a schematic diagram illustrates a computing environment in which various embodiments can be implemented.

Turning now to FIG. 14, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a web server or one or more processors or computing devices associated with a payment service or a payment client entity, i.e. to implement a host responsible for provision of the payment service, or to implement a payer or payee payment client entity. Thus computing device 2600 may be a portable computing device, a personal computer, or any electronic computing device. As shown in FIG. 14, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 14 is intended only as a specific example for purposes of illustrating the preferred embodiment of the device. Many other configurations having more or fewer components than the system depicted in FIG. 14 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Enumerated Example Embodiments

The present disclosure is hereby discussed based on the following clauses that are related to the first to third aspects, which are provided herein as exemplary embodiments for better explaining, describing and understanding the claimed aspects and embodiments.

1. A computer implemented method of implementing a payment service for a one or more clients for transactions associated with a distributed ledger, the method comprising the steps of:

providing an alias for a given client among the one or more clients, the alias being specific to the given client, the alias including or related to a network identifier;

associating the alias with the network identifier in a directory, the step of associating including:

creating a service record based on the network identifier in the directory;

updating the service record to indicate that the payment service is provided by a network or domain associated with the network identifier; and updating the service record to indicate a location for a host computing resource responsible for the payment service, wherein the host computing resource is configured to facilitate identification of the digital wallet associated with the alias, responsive to a request pertaining to a transaction related to the alias.

2. The method as set out in clause 1, wherein each client of the one or more clients are associated with a digital wallet.

3. The method as set out in clause 1 or clause 2 comprising:

responsive to a request from a requesting entity pertaining to a transaction associated with the alias, performing a search of the directory based on the alias;

identifying the service record for the payment service in the directory that relates to the network identifier; and returning the location of the host computing resource for the payment service wherein, a public address of the client associated with the alias is determined based on the returned location, the public address for use in the transaction.

4. A method associated with a transaction for a distributed ledger, wherein an alias is provided for a given client among one or more clients, the alias being specific to the given client, the alias including or related to a network identifier, the method comprising the steps of:

sending from a requesting entity a request pertaining to a transaction, the request associated with the alias;

obtaining the location of a host computing resource associated with a payment service, the location being based on a service record related to the network identifier that is identified in a search of a directory; and wherein a public address of the client associated with the alias is determined based on the location, the public address for use in the transaction.

5. The method as set out in clause 4 wherein each client of the one or more clients is associated with a digital wallet.

6. The method as set out in any preceding clause, wherein the step of returning the location of the host computing resource includes returning a target and port pair, wherein the target includes an identifier of the host computing resource, and wherein the port includes an identifier for an Internet protocol communication port used by the payment service.

7. The method as set out in any preceding clause, wherein the host computing resource is associated with a payment network that is different to the network associated with network identifier of the alias, and wherein the payment service for one or more entities registered with the network is delegated to a payment domain associated with the payment network.

8. The method as set out in clauses 1 to 7 wherein the host computing resource is associated with a payment network, and wherein the domain of the payment network is the same as the domain of the network associated with the network identifier of the alias.

9. A computer implemented method of implementing a payment service for one or more clients for transactions associated with a distributed ledger, the method comprising:

creating a machine readable resource associated with the payment service, wherein the machine readable resource comprises:

at least one endpoint identifier associated with a host computing resource responsible for implementing the payment service for each client, each client being associated with an alias, the alias including or related to a network identifier;

an entry associated with at least one capability among a plurality of capabilities supported by the payment service, instructions and/or a specification for accessing or obtaining a public address associated with the alias, the public address used for facilitating transactions associated with the alias; and providing the machine readable resource at a predictable or known location associated with the payment service.

10. The method as set out in clause 9 wherein each client of the one or more clients is associated with a digital wallet.

11. The method as set out in clause 9 or 10 wherein the plurality of capabilities include one or more of:

payer entity or payee entity validation, multiple digital signatures for transactions, payee entity approval for transactions, email-protocol related payment transactions, and/or call-back requests or responses.

12. The method as set out in any one of clauses 9 to 11 further including the step of determining a location for the host computing resource by the method according to any one of clauses 1 to 5, wherein the endpoint identifier in the machine readable resource is based on the determined location.

13. The method as set out in any one of clauses 9 to 12 wherein, responsive to a request from a requesting entity pertaining to a transaction associated with an alias, the method further comprises steps of:

based on the network identifier associated with the alias in the request, identifying the payment service associated with the alias;

based on the identified payment service, accessing the machine readable resource from the predictable or known location;

responsive to identifying if one or more capabilities required for the transaction are present in the machine readable resource, returning an endpoint identifier of the host computing resource for the payment service from the machine readable resource; and obtaining a public address associated with the alias based on one or more of the instructions and/or specification in the machine readable resource.

14. A method associated with a transaction for a distributed ledger, wherein an alias is provided for a given client among one or more clients, the alias being specific to the given client, the alias including or related to a network identifier, the method comprising the steps of:

sending from a requesting entity a request pertaining to a transaction, the request associated with the alias;

accessing the machine readable resource from a location associated with the payment service, wherein the payment service is identified based on the network identifier in the alias, and wherein the machine readable resource is created according to clause 9;

based on identifying if one or more capabilities required for the transaction are present in the machine readable resource, receiving an endpoint identifier of the host computing resource for the payment service associated with the alias; and obtaining a public address associated with the alias using one or more of the instructions and/or specification in the machine readable resource.

15. The method as set out in any one of clauses 13 or 14, wherein each digital wallet is associated with a user or entity registered for the payment service in the network, wherein each digital wallet is a cryptocurrency wallet associated with a public key and a private key of an asymmetric cryptography key pair for transactions on the distributed ledger, and wherein the step of obtaining the public address includes obtaining the public key of the digital wallet associated with the alias.

16. The method as set out in clause 15, wherein the public address associated with the alias is based on a cryptographic hash of the public key of the digital wallet associated with the alias.

17. The method as set out in any one of clauses 15 or 16, wherein the public key of the digital wallet is an elliptic curve digital signature algorithm (ECDSA) public key, wherein the public key is not part of any transaction previously stored on or posted to the distributed ledger.

18. The method as set out in any one of clauses 13 to 17, wherein the one or more instructions and/or specification in the machine readable resource comprises:

obtaining a public key infrastructure (PKI) request template from the machine readable resource for a PKI endpoint identifier;

including the alias and the network identifier in the template to generate a complete PKI request; and sending a HTTP GET request based on the complete PKI request to obtain a public key associated the alias.

19. The method as set out in any of clauses 9 to 18 wherein the known or predictable location of the machine readable resource is based on at least one of the endpoint identifier, an Internet protocol communication port used by the payment service and/or a configuration specification of the payment service included in a publically accessible well-known domain repository.

20. The method as set out in any one of clauses 9 to 19 wherein the machine readable resource is generated using a Java Script Object Notation (JSON) format.

21. The method as set out in any one of clauses 13 to 20, wherein the step of obtaining the public address associated with the alias includes obtaining a payment destination of a payee entity associated with an alias, the payment destination for use in constructing a transaction for making a cryptocurrency payment from a payer entity to the alias, wherein the step of constructing the transaction comprises:

based on identifying the payment service, accessing the machine readable resource;

returning a payment destination endpoint identifier based on the one or more instructions and/or specification in the machine readable document;

obtaining payment details for the transaction from the payer entity, the payment details including an alias associated with the payee entity client and an amount of cryptocurrency to be paid to the payee;

obtaining a digital signature for associating the payment details with a cryptographic key associated with the payer entity; and generating an output script associated with the payment destination endpoint identifier associated with the alias, the output script provided for embedding in a transaction for the distributed ledger.

22. The method as set out in any one of clauses 14 to 20, wherein the step of obtaining the public address associated with the alias includes obtaining a payment destination of a payee entity associated with the alias, the payment destination for use in constructing a transaction for making a cryptocurrency payment from a payer entity to the alias, wherein the step of constructing the transaction comprises:

sending from the payer entity a request pertaining to the transaction, the request associated with the alias;

accessing the machine readable resource from a location associated with the payment service;

receiving a payment destination endpoint identifier based on the one or more instructions and/or specification in the machine readable document;

providing payment details for the transaction, the payment details including an alias associated with the payee entity client and an amount of cryptocurrency to be paid to the payee;

providing a digital signature for associating the payment details with a cryptographic key;

receiving an output script associated with the payment destination endpoint identifier associated with the alias; and creating the transaction by embedding the received output script in a transaction for the distributed ledger.

23. The method as set out in clauses 21 or 22, wherein the one or more instructions and/or specification in the machine readable resource comprises:

obtaining a payment destination request template from the machine readable resource for a payment destination endpoint identifier;

including the alias and the network identifier in the template to generate a complete payment destination request; and sending a HTTP POST request based on the complete payment destination request to obtain the payment destination endpoint identifier associated with the alias.

24. The method as set out in any one of clauses 21 to 23, wherein the public addresses of the alias and the payer entity each include a public key of the respective digital wallet associated with the payee entity and the payee entity, and wherein the digital signature is used for verifying the identity of the payer entity.

25. The method as set out in any one of clauses 21 to 24 wherein digital signatures associated with both, the payer entity and the payee entity are required for verification of each respective entity, before the created transaction is stored or posted on the distributed ledger.

26. The method as set out in any preceding clause wherein the alias is a payment handle associated with a client.

27. A method for configuring a prefix for making a request pertaining to a transaction from a requesting entity to an alias associated with a client, the method comprising, responsive to receipt of a request from the requesting entity that includes the prefix and the alias, triggering the steps of any one of the preceding clauses based on the alias.

28. A system, comprising:

a processor; and memory including executable instructions that, as a result of execution by the processor, causes the system to perform the computer-implemented method of any preceding clauses.

29. A non-transitory computer-readable storage medium having stored thereon executable instructions that, as a result of being executed by a processor of a computer system, cause the computer system to perform the computer-implemented method of any one of clauses 1 to 27.

The present disclosure is hereby discussed based on the following clauses that are related to the fourth and fifth aspects, relevant to the described subject matter. These clauses are provided for better explaining, describing and understanding the claimed aspects and embodiments.

1. A computer implemented method of implementing a payment service for one or more clients for transactions associated with a distributed ledger, the method comprising:

updating a machine readable resource associated with the payment service, the machine readable resource being provided at or accessible from a predictable or known location associated with the payment service, the machine readable resource comprising:

at least one identifier associated with a host computing resource responsible for implementing the payment service for each client among the one or more clients, each client being associated with an alias, the alias being specific to the client;

an entry associated with at least one capability supported by the payment service, each capability being associated with a protocol or instructions for implementing the respective capability for the one of more clients associated with the payment service; and one or more instructions and/or a specification for accessing or obtaining a public address associated with the alias, the public address used for facilitating transactions associated with the alias;

wherein the step of updating comprises:

adding at least one further capability that is supported by the payment service, wherein the at least one further capability includes:

validation of a payer entity requesting for a payment destination of an alias, wherein a given client among the one or more clients is associated with the alias; and/or asynchronous processing of a request from a payer entity, the request being associated with a payment destination of an alias, wherein a given client among the one or more clients is associated with the alias.

2. A computer implemented method of implementing a payment service for transactions associated with a distributed ledger, wherein an alias is provided for a client among one or more clients associated with the payment service, the alias being specific to the client, each client being provided with a respective alias, the method comprising the steps of:

receiving from a payer entity, a request associated with an alias, the request pertaining to a payment destination of a payee client among the one or more clients associated with the payment service, the payee client being associated with the alias in the request;

validating the payer entity based on at least one capability supported by the payment service, the at least one capability included in a machine readable resource associated with the payment service, the validating including the steps of:

obtaining a public key associated with the payer entity;

determining, based on the request from the payer entity, if a predefined condition is satisfied; wherein based on a determination that the predefined condition is satisfied, validating the payer entity and/or the request associated with the payer entity;

generating an output script associated with the payment destination of the payee client; and sending the output script to the payer entity, the output script provided for embedding in a transaction for the distributed ledger.

3. The method as set out in clause 2, wherein based on a determination that the predefined condition is not satisfied, the method comprises generating and/or sending a response rejecting the received request from the payer entity.

4. The method as set out in clauses 2 or 3, wherein the payment service of the payee client is implemented by the method as set out in clause 1, and wherein the at least one capability supported by the payment service of the payee client is based on the at least one further capability in the updated machine readable resource of clause 1.

5. The method as set out in any one of clauses 2 to 4, wherein the request associated with the alias from the payer entity is a HTTP POST request that includes:

a timestamp indicating the date and time at which the request was sent by the payer entity; and/or a digital signature associated with the public key of the payer entity; and/or a one-time token for the request.

6. The method as set out in clause 5, wherein predefined condition includes:

verifying that the timestamp included in the request is within a predefined duration of the time of receipt of the request by the payment service associated with the payee client; and/or verifying that the digital signature in the request relates to the obtained public key of the payer entity and/or verifying that the one-time token has not been used for a prior request.

7. The method as set out in clause 6 wherein the predefined duration is up to 2 minutes.

8. The method as set out in any one of clauses 2 to 7, wherein the step of sending the output script includes:

applying a digital signature associated with a public key of the payee client to the output script; and sending a signed output script to the payer entity.

9. The method as set out in any preceding clause, wherein the payer entity is associated with a payment service that is different to the payment service of the payee client, and is assigned an alias associated with the different payment service, the alias being included in the request from the payer entity.

10. The method as set out in any one of clauses 1 to 9, wherein the payer entity is associated the same payment service as the payment service of the payee client, and is assigned an alias associated with the same payment service, the alias being included in the request from the payer entity.

11. The method as set out in clauses 9 or 10 wherein the step of obtaining the public key associated with the payer entity further comprises:

accessing a machine readable resource from a location associated with the payment service of the payer entity;

sending a HTTP GET request based on a public key infrastructure (PKI) request template in the machine readable resource, and based on the alias of the payer entity; obtaining the public key associated with the alias in response.

12. A method associated with a transaction for a distributed ledger, wherein an alias is provided for a client among one or more clients associated with a payment service, the alias being specific to the client, each client being associated with a respective alias, the method comprising the steps of:

generating a request associated with an alias, the request pertaining to a payment destination of a payee client among the one or more clients associated with the payment service, the payee client being associated with the alias in the request;

applying a digital signature associated with a public key of a payer entity to the generated request to obtain a signed request;

accessing a machine readable resource associated with the payment service of the alias; sending the signed request based on one or more instructions and/or specifications in the machine readable resource pertaining to the payment destination, the request including a timestamp indicating the date and time of sending;

receiving an output script associated with the requested payment destination; and embedding the received output script in a transaction for the distributed ledger, the transaction associated with the payer entity and the payee client.

13. The method as set out in clause 12 wherein the received output script includes a digital signature based on a public key associated with the payee client, wherein the method includes verifying the signature by the steps of:

sending a HTTP GET request based on a public key infrastructure (PKI) request template in the machine readable resource, and based on the alias of the payee client;

obtaining the public key associated with the alias in response; and verifying that the digital signature in the output script relates to the obtained public key of the payee client.

14. A computer implemented method of implementing a payment service for transactions associated with a distributed ledger, wherein an alias is provided for a client among one or more clients associated with the payment service, the alias being specific to the client, each client being provided with a respective alias, the method comprising the steps of:

receiving from a payer entity, a request associated with an alias, the request pertaining to a payment destination of a payee client among the one or more clients associated with the payment service, the payee client being associated with the alias in the request;

implementing asynchronous processing of the request based on at least one capability supported by the payment service, the at least one capability identified using a machine readable resource associated with the payment service, the asynchronous processing including the steps of:

generating a token that is specific to the received request;

sending the token to the payer entity;

responsive to receiving approval of the request, generating an output script associated with the payment destination of the payee client;

generating a call-back request including the token and the generated output script; and sending the call-back request to the payer entity, the output script in the call-back request provided for embedding in a transaction for the distributed ledger.

15. The method as set out in clause 14, wherein responsive to receiving rejection of the request or upon expiry of a predefined period, the method comprises generating and sending a response rejecting the received request from the payer entity.

16. The method as set out in clauses 14 or 15, wherein the payment service of the payee client is implemented by the method as set out in clause 1, and wherein the at least one capability supported by the payment service of the payee client is based on the at least one further capability in the updated machine readable resource of clause 1.

17. The method as set out in any one of clauses 14 to 16 wherein, the step of implementing asynchronous processing of the request is performed responsive to the payee client being non-responsive or offline for a predefined period after receipt of the request from the payee entity.

18. The method as set out in any one of clauses 14 to 17 further comprising:

sending a notification regarding the request to the payee entity; and
receiving approval or rejection of the request from the payee client.

19. The method as set out in any one of clause 14 to 18 wherein the step of sending the token and/or the step of sending the call-back request includes:

applying a digital signature associated with a public key of the payee client to the token to obtain a signed token, or to the combination of the output script and the token in the call-back request to obtain a signed call-back request; and
sending the signed token or signed call-back request to the payer entity.

20. The method as set out in any one of clauses 14 to 19, wherein the payer entity is associated with a payment service that is the same as, or different to, the payment service of the payee client, and is assigned an alias associated with the payment service, the alias being included in the request from the payer entity.

21. The method as set out in clause 20, wherein the call-back request is a HTTP POST request based on a payment destination request template, the token, and the alias of the payer entity, wherein the payment destination request template is obtained by accessing a machine readable resource associated with the payment service of the payer entity.

22. The method as set out in any one of clause 14 to 21 further comprising validating the payer entity according to method as set out in any one of clauses 2 to 11.

23. A method associated with a transaction for a distributed ledger, wherein an alias is provided for a client among one or more clients associated with a payment service, the alias being specific to the client, each client being associated with a respective alias, the method comprising the steps of:

generating a request associated with an alias, the request pertaining to a payment destination of a payee client among the one or more clients associated with the payment service, the payee client being associated with the alias in the request;
sending a request based on one or more instructions and/or specifications accessed from a machine readable resource pertaining to the payment destination, the machine readable resource associated with the payment service;
receiving a token from the payment service, the token being specific to the request, the token associated with a digital signature;
verifying that the digital signature associated with the token relates to a public key of the payee client;
responsive to verification being successful, updating a record associated with the request based on the token;
receiving a call-back request, the call-back request including the token and an output script associated with the requested payment destination, the call-back request associated with a digital signature;

verifying that the digital signature associated with the call-back request relates to the public key of the payee client;
responsive to verification being successful, correlating the token in the call-back request with the updated record; and
embedding the received output script in a transaction for the distributed ledger, the transaction associated with the payer entity and payee client.

24. The method as set out in clause 23 wherein the received token or call-back request includes a digital signature based on a public key associated with the payee client, and wherein the step of verifying the digital signature includes:

sending a HTTP GET request based on a public key infrastructure (PKI) request template in the machine readable resource, and based on the alias of the payee client;
obtaining the public key associated with the alias in response; and
verifying that the digital signature associated with the token or the call-back request relates to the obtained public key of the payee client.

25. The method as set out in any one of clause 23 and 24 further comprising the method steps as set out in any one of clauses 12 or 13 for validating the payer entity.

26. A method associated with a transaction for a distributed ledger, wherein an alias is provided for a client among one or more clients associated with a payment service, the alias being specific to the client, each client being associated with a respective alias, the method comprising the steps of:

receiving by a payee client, a notification of a request associated with an alias, the request pertaining to a payment destination of the payee client among the one or more clients associated with the payment service, the payee client being associated with the alias in the request;
approving or rejecting the request when the payee client is online, the approval or rejection provided using an interface, or based on a predefined record associated with allowed or disallowed request properties; and
sending a response to the payment service based on said approval or rejection.

27. The method as set out in clause 26, wherein the request is processed by the payment service by the method as set out in any one of clause 14 to 22.

28. The method as set out in as set out in any of clause 1 to 27, wherein one or more instructions and/or specification in the machine readable resource associated with the payment service comprises:

obtaining a public key validity request template from the machine readable resource for a PKI endpoint identifier;
including the alias in the template to generate a complete public key validity request; and sending a HTTP GET request based on the completed public key validity request to verify that the public key in the request is valid for the alias in the request.

29. A computing device or system, comprising:

at least one a processor; and
memory including executable instructions that, as a result of execution by the at least one processor, causes the computing device or system to perform the computer-implemented method of any preceding clauses.

30. A non-transitory computer-readable storage medium having stored thereon executable instructions that, as a result of being executed by a processor of a system or computing device, cause the system or computing device to perform the computer-implemented method of any one of clauses 1 to 28.

31. A method for associated with a transaction for a distributed ledger comprising the steps of:

sending a request from a payer entity, the request based on an alias for a payee entity;

validating the payer entity based on a timestamp and a signature included in the request;

responsive to successful validation, sending an output script to the payer entity;

creating a transaction based on the output script, the transaction to be posted to the distributed ledger.

32. A method associated with a transaction for a distributed ledger comprising the steps of:

sending a request from a payer entity, the request based on an alias for a payee entity;

providing an acknowledgment of receipt of the request to the payer entity;

providing a notification of the request to the payee entity;

when the payee entity is online or available, obtaining approval of the request;

responsive to said approval, sending an output script to the payer entity;

creating a transaction based on the output script, the transaction to be posted to the distributed ledger.

33. A method as set out in clause 32, including the method as set out in clause 31.

34. A system comprising a payer entity, a payee entity and a payment service associated with at least the payee entity, wherein the payer entity, payee entity and/or the payment service each include at least one processor for executing computer readable instructions for implementing the method steps of any one of clauses 31 to 33.

The invention claimed is:

1. A computer-implemented method of implementing a payment service for transactions associated with a distributed ledger, wherein each client among one or more clients associated with the payment service has a public key and a respective alias specific to the client, the method comprising, at the payment service:

receiving from a payer entity, a request associated with an alias, the request pertaining to a payment destination of a payee client among the one or more clients associated with the payment service, the payee client being associated with the alias in the request;

validating the payer entity based on at least one capability supported by the payment service, the at least one capability included in a machine-readable resource associated with the payment service, the validating including:

obtaining a public key associated with the payer entity; and determining, based on the request from the payer entity, whether a predefined condition defined for the capability is satisfied, by verifying that the request includes a cryptographically secure one-time token generated for a blockchain-based distributed ledger of previously issued tokens across multiple nodes, and wherein the one-time token is validated by querying the distributed ledger to confirm the token has not been previously used;

wherein based on a determination that the predefined condition is satisfied.

2. The method as claimed in claim 1, wherein based on a determination that the predefined condition is not satisfied, the method further comprises generating and/or sending a response rejecting the received request from the payer entity.

3. The method as claimed in claim 1, wherein the payment service of the payee client is implemented by implementing the payment service for one or more clients for transactions associated with a distributed ledger, and wherein the at least one capability supported by the payment service of the payee client is based on the at least one further capability in the machine-readable resource.

4. The method as claimed in claim 1, wherein the predefined duration is up to 2 minutes.

5. The method as claimed in claim 2, wherein the payer entity:

is associated with an additional payment service that is different from the payment service of the payee client; and is assigned an additional alias associated with the additional payment service, the additional alias being included in the request from the payer entity.

6. The method as claimed in claim 5, wherein the step of obtaining the public key associated with the payer entity further comprises:

accessing a machine-readable resource from a location associated with the payment service of the payer entity;

sending an HTTP GET request based on a public key infrastructure (PKI) request template in the machine-readable resource, and based on the alias of the payer entity; and obtaining the public key associated with the alias in response.

7. The method as claimed in claim 1, wherein the payer entity:

is associated with the same payment service as the payment service of the payee client; and is assigned an alias associated with the same payment service, the alias being included in the request from the payer entity.

8. The method as claimed in claim 1, wherein one or more instructions and/or specifications in the machine-readable resource associated with the payment service comprises:

obtaining a public key validity request template from the machine-readable resource for a PKI endpoint identifier;

including the alias in the template to generate a complete public key validity request; and sending an HTTP GET request based on the completed public key validity request to verify that the public key in the request is valid for the alias in the request.

9. A computing device or system for implementing a payment service for transactions associated with a distributed ledger, wherein each client among one or more clients associated with the payment service has a public key and a respective alias specific to the client, the computing device or system comprising:

at least one processor; and memory including executable instructions that, as a result of execution by the at least one processor, cause the computing device or system to perform operations for the payment service, the operations comprising:

receiving from a payer entity, a request associated with an alias, the request pertaining to a payment destination of a payee client among the one or more clients associated with the payment service, the payee client being associated with the alias in the request;

validating the payer entity based on at least one capability supported by the payment service, the at least one capability included in a machine-readable resource associated with the payment service, the validating including:

obtaining a public key associated with the payer entity; and determining, based on the request from the payer entity, whether a predefined condition defined for the capability is satisfied, by verifying that the request includes a cryptographically secure one-time token generated for a blockchain-based distributed ledger of previously issued tokens across multiple nodes, and wherein the one-time token is validated by querying the distributed ledger to confirm the token has not been previously used;

wherein based on a determination that the predefined condition is satisfied:

validating the payer entity and/or the request associated with the payer entity;

generating a complete payment destination request based on the alias and a payment destination request template of the machine-readable resource;

providing an HTTP POST request based on the complete payment destination request to obtain a payment destination endpoint identifier associated with the alias;

generating an output script associated with the payment destination of the payee client based on the payment destination endpoint identifier obtained through the HTTP POST request; and applying a digital signature associated with a public key of the payee client to the output script; and sending a signed output script to the payer entity, the output script provided for embedding in a transaction for the distributed ledger wherein the HTTP POST request includes a timestamp indicating date and time at which the request was sent by the payer entity;

wherein the predefined condition includes verifying that the timestamp included in the request is within a predefined duration of the time of receipt of the request by the payment service associated with the payee client before processing the transaction to prevent a replay attack, and rejecting the request if the timestamp is not included in the request or if the timestamp is not within the predefined duration.

10. A non-transitory computer-readable storage medium having stored thereon executable instructions that, as a result of being executed by a processor of a system or computing device, cause the system or computing device to perform operations to implement a payment service for transactions associated with a distributed ledger, wherein each client among one or more clients associated with the payment service has a public key and a respective alias specific to the client, the operations comprising:

receiving from a payer entity, a request associated with an alias, the request pertaining to a payment destination of a payee client among the one or more clients associated with the payment service, the payee client being associated with the alias in the request;

validating the payer entity based on at least one capability supported by the payment service, the at least one capability included in a machine-readable resource associated with the payment service, the validating including:

obtaining a public key associated with the payer entity; and determining, based on the request from the payer entity, whether a predefined condition defined for the capability is satisfied, by verifying that the request includes a cryptographically secure one-time token generated for a blockchain-based distributed ledger of previously issued tokens across multiple nodes, and wherein the one-time token is validated by querying the distributed ledger to confirm the token has not been previously used;

wherein based on a determination that the predefined condition is satisfied:

validating the payer entity and/or the request associated with the payer entity;

generating a complete payment destination request based on the alias and a payment destination request template of the machine-readable resource;

providing an HTTP POST request based on the complete payment destination request to obtain a payment destination endpoint identifier associated with the alias;

generating an output script associated with the payment destination of the payee client based on the payment destination endpoint identifier obtained through the HTTP POST request; and applying a digital signature associated with a public key of the payee client to the output script; and sending a signed output script to the payer entity, the output script provided for embedding in a transaction for the distributed ledger wherein the HTTP POST request includes a timestamp indicating date and time at which the request was sent by the payer entity;

wherein the predefined condition includes verifying that the timestamp included in the request is within a predefined duration of the time of receipt of the request by the payment service associated with the payee client before processing the transaction to prevent a replay attack, and rejecting the request if the timestamp is not included in the request or if the timestamp is not within the predefined duration.

* * * * *